(12) United States Patent
Tachibana

(10) Patent No.: US 10,771,640 B2
(45) Date of Patent: Sep. 8, 2020

(54) IMAGE FORMING APPARATUS INCLUDING EVENT DETECTION, CONTROL METHOD, AND NON-TRANSITORY COMPUTER-READABLE STORAGE MEDIUM STORING PROGRAM

(71) Applicant: CANON KABUSHIKI KAISHA, Tokyo (JP)

(72) Inventor: Yoshiro Tachibana, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/375,988

(22) Filed: Apr. 5, 2019

(65) Prior Publication Data
US 2019/0312986 A1 Oct. 10, 2019

(30) Foreign Application Priority Data
Apr. 9, 2018 (JP) ................. 2018-074990

(51) Int. Cl.
*H04N 1/00* (2006.01)
*G06F 3/12* (2006.01)

(52) U.S. Cl.
CPC ....... *H04N 1/00408* (2013.01); *G06F 3/1204* (2013.01); *G06F 3/1229* (2013.01); *H04N 1/00496* (2013.01)

(58) Field of Classification Search
CPC ........... G05B 2219/32226; G05B 2219/32234; G05B 2219/14112; G05B 2219/23373; G05B 2219/24019; G03G 21/1638; G03G 2215/00548; G03G 2221/1675; G03G 15/2035; H04N 1/00543; H04N 1/00538; H04N 1/00; H04N 1/00076; H04N 1/00037; H04N 1/00079; H04N 1/00084; H04N 1/32776; H04N 1/33346; H04N 1/00204; H04N 1/4433; H04N 2201/0041; H04N 2201/0055; H04Q 9/00; H04M 1/00; G06F 3/0484; G06F 3/12; G06F 3/1217; G06F 3/1218; G06F 3/1219; G06F 3/121; G06F 3/1256; G06F 3/1292; G06F 3/1235; G06F 3/1204; B41J 29/42; B41J 29/38; H04L 9/3073
See application file for complete search history.

(56) References Cited

U.S. PATENT DOCUMENTS 6,750,878 B1 * 6/2004 Tatsuo ................. G03G 15/502
                                                                399/81
9,307,105 B2    4/2016 Ikeda
(Continued)

FOREIGN PATENT DOCUMENTS

JP    2003241584 A    8/2003
JP    2015082706 A    4/2015

*Primary Examiner* — Juan M Guillermety
(74) *Attorney, Agent, or Firm* — Rossi, Kimms & McDowell LLP

(57) ABSTRACT

In an image forming apparatus, an event detection unit detects occurrence of an event which requires replacement of a part, a notification unit notifies guidance for replacing the part if the event detection unit detects occurrence of the event, and a control unit ends a notification of the guidance using, as conditions, a case in which a cover open to perform the replacement is set in a closed state and a case in which an input of an instruction that the replacement has completed is accepted.

11 Claims, 21 Drawing Sheets

(56) References Cited

U.S. PATENT DOCUMENTS

| | | | |
|---|---|---|---|
| 2005/0024418 A1* | 2/2005 | Yoshiyama | B41J 2/16517 347/19 |
| 2006/0071952 A1* | 4/2006 | Motominami | B41J 2/1752 347/5 |
| 2008/0124096 A1* | 5/2008 | Wada | G03G 15/55 399/24 |
| 2008/0278754 A1* | 11/2008 | Hibino | G06F 3/1286 358/1.15 |
| 2011/0149329 A1* | 6/2011 | Moro | G06F 3/1257 358/1.13 |
| 2013/0121709 A1* | 5/2013 | Kurihara | G03G 15/75 399/27 |
| 2014/0147133 A1* | 5/2014 | Sato | G03G 15/55 399/12 |
| 2014/0160511 A1* | 6/2014 | Yamada | G03G 15/5016 358/1.14 |
| 2016/0182742 A1* | 6/2016 | Ikeda | H04N 1/00488 358/1.15 |
| 2017/0185878 A1* | 6/2017 | Matsuo | G06K 15/408 |
| 2017/0208205 A1* | 7/2017 | Ikeda | G03G 15/502 |
| 2018/0089016 A1* | 3/2018 | Tachibana | G03G 15/556 |
| 2018/0136805 A1* | 5/2018 | Qu | G06F 3/0484 |

\* cited by examiner

FIG. 4

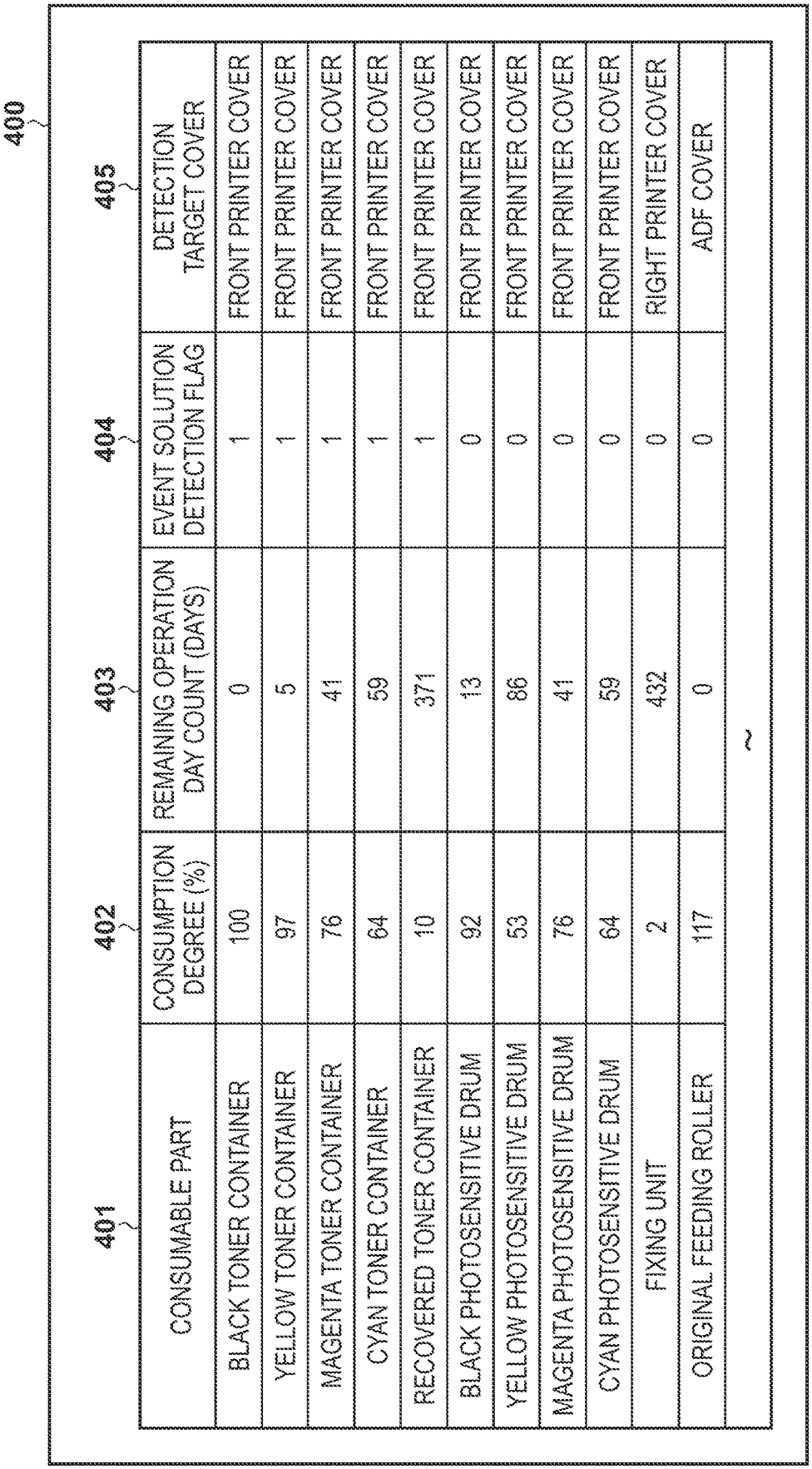

| 401 | 402 | 403 | 404 | 405 |
|---|---|---|---|---|
| CONSUMABLE PART | CONSUMPTION DEGREE (%) | REMAINING OPERATION DAY COUNT (DAYS) | EVENT SOLUTION DETECTION FLAG | DETECTION TARGET COVER |
| BLACK TONER CONTAINER | 100 | 0 | 1 | FRONT PRINTER COVER |
| YELLOW TONER CONTAINER | 97 | 5 | 1 | FRONT PRINTER COVER |
| MAGENTA TONER CONTAINER | 76 | 41 | 1 | FRONT PRINTER COVER |
| CYAN TONER CONTAINER | 64 | 59 | 1 | FRONT PRINTER COVER |
| RECOVERED TONER CONTAINER | 10 | 371 | 1 | FRONT PRINTER COVER |
| BLACK PHOTOSENSITIVE DRUM | 92 | 13 | 0 | FRONT PRINTER COVER |
| YELLOW PHOTOSENSITIVE DRUM | 53 | 86 | 0 | FRONT PRINTER COVER |
| MAGENTA PHOTOSENSITIVE DRUM | 76 | 41 | 0 | FRONT PRINTER COVER |
| CYAN PHOTOSENSITIVE DRUM | 64 | 59 | 0 | FRONT PRINTER COVER |
| FIXING UNIT | 2 | 432 | 0 | RIGHT PRINTER COVER |
| ORIGINAL FEEDING ROLLER | 117 | 0 | 0 | ADF COVER |

| MAINTENANCE ID | MOVING IMAGE LIST |
|---|---|
| 001 | A1,A2,A3,A10 |
| 002 | A1,A4,A5,A10 |
| 003 | A1,A6,A7,A10 |
| 004 | A1,A8,A9,A10 |
| 005 | A1,A2,A3,A4,A5,A10 |
| 006 | A1,A2,A3,A6,A7,A10 |
| 007 | A1,A2,A3,A8,A9,A10 |
| 008 | A1,A4,A5,A6,A7,A10 |
| 009 | A1,A4,A5,A8,A9,A10 |
| 010 | A1,A6,A7,A8,A9,A10 |
| 011 | A1,A2,A3,A4,A5,A6,A7,A10 |
| 012 | A1,A2,A3,A4,A5,A8,A9,A10 |
| 013 | A1,A2,A3,A6,A7,A8,A9,A10 |
| 014 | A1,A4,A5,A6,A7,A8,A9,A10 |
| 015 | A1,A2,A3,A4,A5,A6,A7,A8,A9,A10 |
| 016 | B1,B2,B3 |
| 017 | C1,C2,C3,C10 |
| 018 | C1,C4,C5,C10 |
| 019 | C1,C6,C7,C10 |
| 020 | C1,C8,C9,C10 |
| 021 | C1,C2,C3,C4,C5,C10 |
| 022 | C1,C2,C3,C6,C7,C10 |
| 023 | C1,C2,C3,C8,C9,C10 |
| 024 | C1,C4,C5,C6,C7,C10 |
| 025 | C1,C4,C5,C8,C9,C10 |
| 026 | C1,C6,C7,C8,C9,C10 |
| 027 | C1,C2,C3,C4,C5,C6,C7,C10 |
| 028 | C1,C2,C3,C4,C5,C8,C9,C10 |
| 029 | C1,C2,C3,C6,C7,C8,C9,C10 |
| 030 | C1,C4,C5,C6,C7,C8,C9,C10 |
| 031 | C1,C2,C3,C4,C5,C6,C7,C8,C9C10 |
| 032 | D1,D2,D3,D4 |
| 033 | E1,E2,E3,E4 |

F I G. 5B-1

| MOVING IMAGE ID | MOVING IMAGE LIST | PLAYBACK TIME | COVER OPENING /CLOSING FLAG | MESSAGE |
|---|---|---|---|---|
| A1 | /movie/A1.mpeg | 0:13 | 0 | PLEASE PREPARE NEW TONER CONTAINER AND OPEN FRONT COVER. |
| A2 | /movie/A2.mpeg | 0:10 | 1 | PLEASE EJECT BLACK TONER CONTAINER. |
| A3 | /movie/A3.mpeg | 0:30 | 1 | PLEASE SET NEW BLACK TONER CONTAINER TO DEEP POSITION. |
| A4 | /movie/A4.mpeg | 0:10 | 1 | PLEASE EJECT YELLOW TONER CONTAINER. |
| A5 | /movie/A5.mpeg | 0:30 | 1 | PLEASE SET NEW YELLOW TONER CONTAINER TO DEEP POSITION. |
| A6 | /movie/A6.mpeg | 0:10 | 1 | PLEASE EJECT MAGENTA TONER CONTAINER. |
| A7 | /movie/A7.mpeg | 0:30 | 1 | PLEASE SET NEW MAGENTA TONER CONTAINER TO DEEP POSITION. |
| A8 | /movie/A8.mpeg | 0:10 | 1 | PLEASE EJECT CYAN TONER CONTAINER. |
| A9 | /movie/A9.mpeg | 0:30 | 1 | PLEASE SET NEW CYAN TONER CONTAINER TO DEEP POSITION. |
| A10 | /movie/A10.mpeg | 0:17 | 1 | PLEASE CLOSE FRONT COVER. |
| B1 | /movie/B1.mpeg | 0:13 | 0 | PLEASE PREPARE NEW RECOVERED TONER CONTAINER AND OPEN FRONT COVER. |
| B2 | /movie/B2.mpeg | 0:11 | 1 | PLEASE EJECT RECOVERED TONER CONTAINER. |
| B3 | /movie/B3.mpeg | 0:25 | 1 | PLEASE SET NEW RECOVERED TONER CONTAINER AND CLOSE FRONT COVER. |

F I G. 5B-2

| MOVING IMAGE ID | MOVING IMAGE LIST | PLAYBACK TIME | COVER OPENING /CLOSING FLAG | MESSAGE |
|---|---|---|---|---|
| C1 | /movie/C1.mpeg | 0:19 | 0 | PLEASE PREPARE NEW DRUM UNIT AND OPEN FRONT COVER. |
| C2 | /movie/C2.mpeg | 0:21 | 1 | PLEASE EJECT BLACK DRUM UNIT. |
| C3 | /movie/C3.mpeg | 0:13 | 1 | PLEASE SET NEW BLACK DRUM UNIT TO DEEP POSITION. |
| C4 | /movie/C4.mpeg | 0:21 | 1 | PLEASE EJECT YELLOW DRUM UNIT. |
| C5 | /movie/C5.mpeg | 0:13 | 1 | PLEASE SET NEW YELLOW DRUM UNIT TO DEEP POSITION. |
| C6 | /movie/C6.mpeg | 0:21 | 1 | PLEASE EJECT MAGENTA DRUM UNIT. |
| C7 | /movie/C7.mpeg | 0:13 | 1 | PLEASE SET NEW MAGENTA DRUM UNIT TO DEEP POSITION. |
| C8 | /movie/C8.mpeg | 0:21 | 1 | PLEASE EJECT CYAN DRUM UNIT. |
| C9 | /movie/C9.mpeg | 0:13 | 1 | PLEASE SET NEW CYAN DRUM UNIT TO DEEP POSITION. |
| C10 | /movie/C10.mpeg | 0:26 | 1 | PLEASE PRESS [REPLACEMENT COMPLETION] AFTER CLOSING FRONT COVER. |
| D1 | /movie/D1.mpeg | 0:06 | 0 | PLEASE PREPARE NEW FIXING UNIT AND OPEN RIGHT COVER. |
| D2 | /movie/D2.mpeg | 013 | 1 | PLEASE IT IS POSSIBLE FOR THE FIXING UNIT TO BE HOT, PLEASE REMOVE IT WITH CAUTION. |
| D3 | /movie/D3.mpeg | 0:10 | 1 | PLEASE MOUNT NEW FIXING UNIT. |
| D4 | /movie/D4.mpeg | 0:06 | 1 | PLEASE PRESS [REPLACEMENT COMPLETE] AFTER CLOSING RIGHT COVER. |
| E1 | /movie/E1.mpeg | 0:07 | 0 | PLEASE PREPARE NEW ADF MAINTENANCE KIT AND OPEN ADF COVER. |
| E2 | /movie/E2.mpeg | 0:27 | 1 | PLEASE REMOVE ORIGINAL FEEDING ROLLER. |
| E3 | /movie/E3.mpeg | 0:21 | 1 | PLEASE MOUNT NEW ORIGINAL FEEDING ROLLER. |
| E4 | /movie/E4.mpeg | 0:05 | 1 | PLEASE PRESS [REPLACEMENT COMPLETE] AFTER CLOSING ADF COVER. |

TO FIG.6C

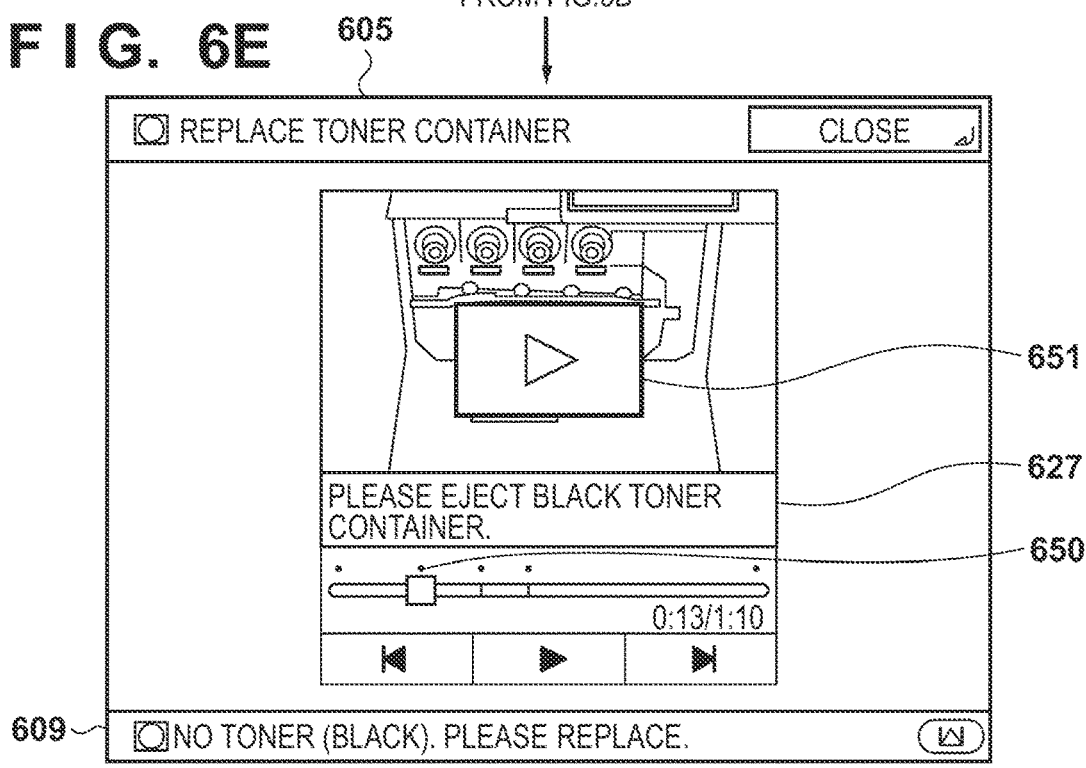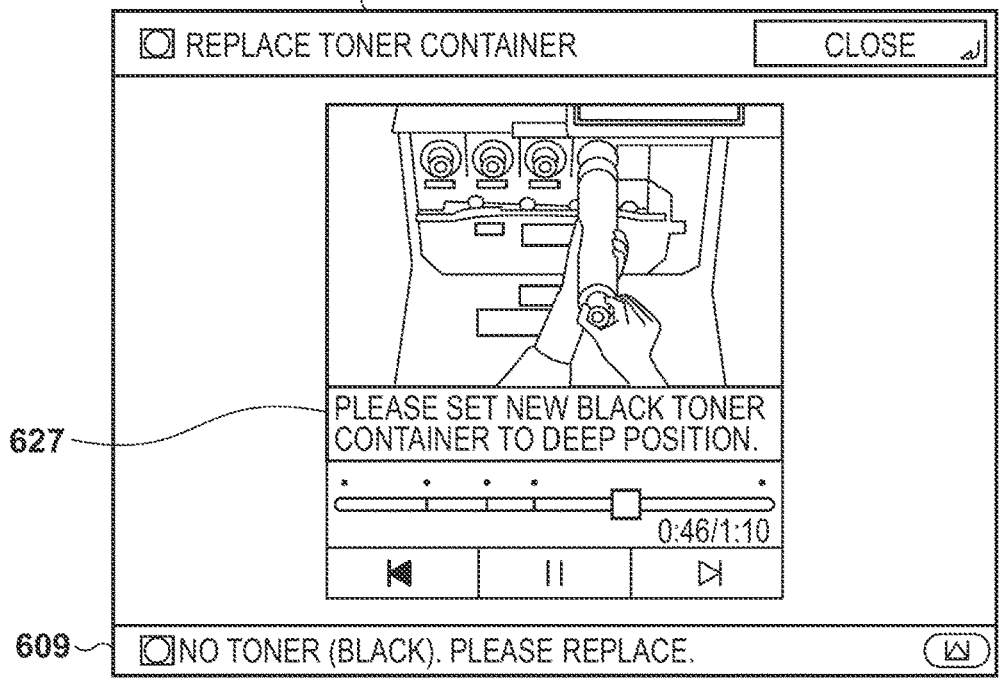

TO FIG.8C

IMAGE FORMING APPARATUS INCLUDING EVENT DETECTION, CONTROL METHOD, AND NON-TRANSITORY COMPUTER-READABLE STORAGE MEDIUM STORING PROGRAM

BACKGROUND OF THE INVENTION

Field of the Invention

The present invention relates to an image forming apparatus for notifying guidance, a control method, and a non-transitory computer-readable storage medium storing a program.

Description of the Related Art

An image forming apparatus such as a printer, a copying machine, or a facsimile apparatus replaceably includes a plurality of consumable parts, such as a toner container, a recovered toner container, a photosensitive drum, and a fixing unit, which are consumed upon the operation of the image forming apparatus. These consumable parts cannot be finally used because they are consumed over time or the consumable materials stored in the containers are used up. In such an image forming apparatus, in order to properly maintain the printing quality, not only a serviceman but also a user often replaces each consumable part periodically. Accordingly, there is proposed an image forming apparatus which presents the work contents at the time of maintenance of a consumable part in detail by using a moving image having an abundant amount of information to a user who is not accustomed to the replacement of the consumable part (Japanese Patent Laid-Open No. 2015-82706).

In the image forming apparatus described in Japanese Patent Laid-Open No. 2015-82706, moving images are prepared for each of the work contents (work elements), a plurality of moving images each representing the work contents are combined upon occurrence of a maintenance event, and a series of work contents (guidance) required to solve the maintenance event is present to the user. For example, if the absence of toner is detected, a plurality of moving images in an order of a moving image for work for opening a cover formed in a housing, a moving image for removing an empty toner container, a moving image for work for attaching a new toner container, and a moving image of work for closing the cover can be played back as the guidance.

The consumable parts of the image forming apparatus are classified into a consumable part which is automatically detected by the apparatus upon replacement of an old consumable part with a new consumable part and a consumable part which cannot be automatically detected by the apparatus upon the replacement. As for the consumable part which is automatically detected by the image forming apparatus, if a maintenance event has occurred in the apparatus, the maintenance event is solved upon replacement of the old consumable part with the new consumable part, and at the same time the guidance ends and the life of the consumable part managed by the apparatus is reset.

As a mechanism for improving reliability of resetting of the life of the consumable part, there is disclosed a technique of providing a sensor for detecting the attachment/detachment of the consumable part and prompting the user to input whether a counter is reset upon detection of the attachment of the consumable part (Japanese Patent Laid-Open No. 2003-241584).

The image forming apparatus described in Japanese Patent Laid-Open No. 2015-82706 does not consider a consumable part replacement method for a consumable part which is not automatically detected by the apparatus upon replacement of the old consumable part with the new consumable part. In order to end the guidance and reset the life upon replacement of the consumable part which is not automatically detected by the apparatus, a sensor for detecting the attachment/detachment of the consumable part must be separately arranged as described in Japanese Patent Laid-Open No. 2003-241584. However, this complicates the hardware arrangement, and the number of parts increases, thereby increasing the cost.

SUMMARY OF THE INVENTION

An aspect of the present invention is to eliminate the above-mentioned problems with the conventional technology. The present invention provides an image forming apparatus, a control method, and a non-transitory computer-readable storage medium storing a program, all of which can implement the appropriate end of guidance by replacement of the part regardless of the presence/absence of an arrangement for detecting the replacement of the part.

The present invention in one aspect provides an image forming apparatus comprising: an event detection unit configured to detect occurrence of an event which requires replacement of a part; a notification unit configured to notify guidance for replacing the part if the event detection unit detects occurrence of the event; and a control unit configured to end a notification of the guidance using, as conditions, a case in which a cover open to perform the replacement is set in a closed state and a case in which an input of an instruction that the replacement has completed is accepted.

The present invention enables to implement the appropriate end of guidance by the replacement of the part regardless of the presence/absence of an arrangement for detecting the replacement of the part.

Further features of the present invention will become apparent from the following description of exemplary embodiments.

BRIEF DESCRIPTION OF THE DRAWINGS

FIG. 4 is a consumable part management table;

FIGS. 5A, 5B-1, and 5B-2 are views showing tables of the data structure which defines the relationship between the maintenance events and moving images;

FIGS. 6A to 6H are views showing screen transition displayed on an output unit of the image forming apparatus;

DESCRIPTION OF THE EMBODIMENTS

Figure 1:
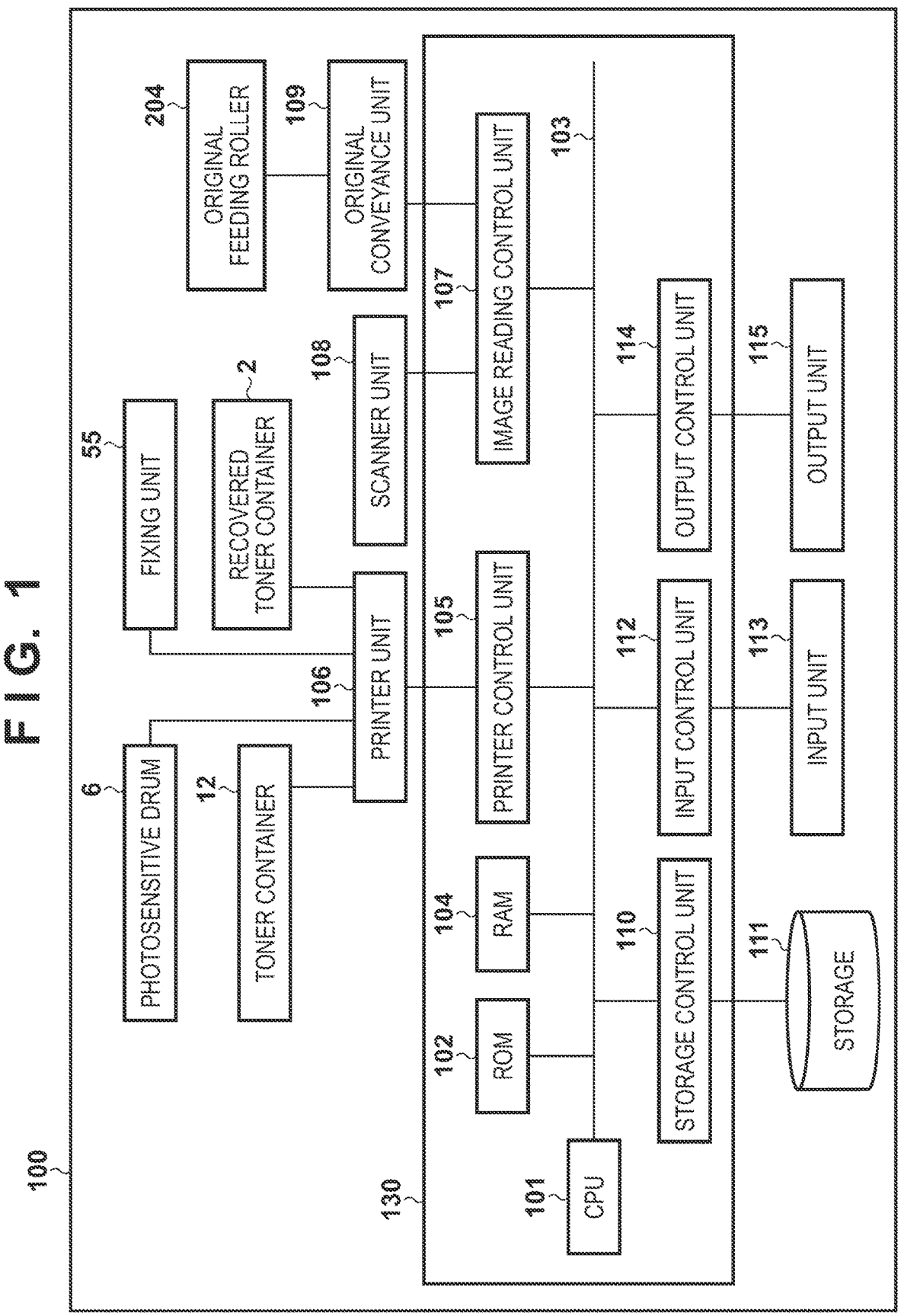
FIG. 1 is a block diagram of hardware of an image forming apparatus.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same components and a description thereof will be omitted.

FIG. 1 is a block diagram of a hardware configuration of an image forming apparatus 100 according to this embodiment. Referring to FIG. 1, the image forming apparatus 100 includes a controller 130 including a CPU 101. The controller 130 includes a ROM 102, a RAM 104, a printer control unit 105, an image reading control unit 107, a storage control unit 110, an input control unit 112, and an output control unit 114. The components of the controller 130 are connected to each other via a bus 103. The image forming apparatus 100 also includes hardware such as a storage (storage unit) 111, a printer unit 106, a scanner unit 108, an original conveyance unit 109, an input unit 113, and an output unit 115. The printer control unit 105, the image reading control unit 107, the storage control unit 110, the input control unit 112, and the output control unit 114 of the controller 130 function as the interfaces for causing the CPU 101 to control all the hardware components.

A large number of consumable parts can be replaceably arranged in the image forming apparatus 100. For example, in the printer unit 106, a toner container 12, a recovered toner container 2, photosensitive drums 6, a fixing unit 55, and the like are consumable parts that can be replaced and can be included detachably from the printer unit 106. In the original conveyance unit 109, an original feeding roller 204 and the like are replaceable consumable parts and can be arranged detachably from the original conveyance unit 109. In this embodiment, these consumable parts are described as consumable parts replaceable by a user, but the present invention is not limited to these consumable parts.

The controller 130 including the CPU 101 controls the overall image forming apparatus 100. The CPU 101 activates an OS (Operating System) by a boot program stored in the ROM 102. The CPU 101 then executes control programs stored in the storage 111 and the ROM 102 on the OS.

The RAM 104 is used as a temporary storage area such as a main memory or a work area of the CPU 101. The storage 111 is a nonvolatile storage device that can be read from and written to, such as an HDD (Hard Disk Drive). The storage 111 stores programs for controlling the entire image forming apparatus 100, various kinds of application programs, data for managing consumable parts, and various kinds of data such as moving images representing a series of work contents required for solving a maintenance event. The CPU 101 accesses the storage 111 via the storage control unit 110.

The CPU 101 reads out the control program and application programs from the storage 111 and the ROM 102 and executes the programs loaded into the RAM 104, thereby controlling the image forming apparatus 100. In this manner, hardware such as the CPU 101 which constitutes the controller 130, the ROM 102, the RAM 104, the storage 111, and the like forms a so-called computer of the present invention.

Note that in the image forming apparatus 100 of this embodiment, although one CPU 101 executes various kinds of processing shown by flowcharts (to be described later) using the programs loaded in one memory (RAM 104), another mode may be employed. For example, a plurality of processors, a RAM, a ROM, and a storage may be cooperated to execute various kinds of processing shown by flowcharts to be described later. In addition, some of the processing operations may be executed using a hardware circuit such as an ASIC or FPGA.

The CPU 101 controls the scanner unit 108 via the image reading control unit 107 to read an image on an original, thereby generating image data. In addition, the CPU 101 can control the original conveyance unit 109 having an ADF (Automatic Document Feeder), convey originals stacked on an original table of the original conveyance unit 109 to the scanner unit 108 one by one, and generate image data. The scanner unit 108 scans an original using an optical reading device such as a CCD and converts the original image information into electrical signal data. The image data obtained by reading the image on the original is stored in the storage 111 and used for printing processing (to be described later). The CPU 101 cooperates with the printer control unit 105 and the printer unit 106 to form an image on a sheet (printing medium) such as a paper sheet.

The input control unit 112 is connected to the input unit 113 and the controller 130 to receive a user operation instruction from the input unit 113 such as a touch panel or a hard key. The output control unit 114 is connected to the output unit 115 and the controller 130 to control the output unit 115 including a display unit such as an LCD or CRT, thereby displaying an operation screen and a moving image (to be described later) to the user. Note that the output unit 115 is described as a display unit for performing display output. However, the output unit 115 may include a loudspeaker for performing audio output in addition to the display output. The input unit 113 may include a microphone for performing audio input in addition to the input of the touch panel, the hard key, or the like.

Figure 2:
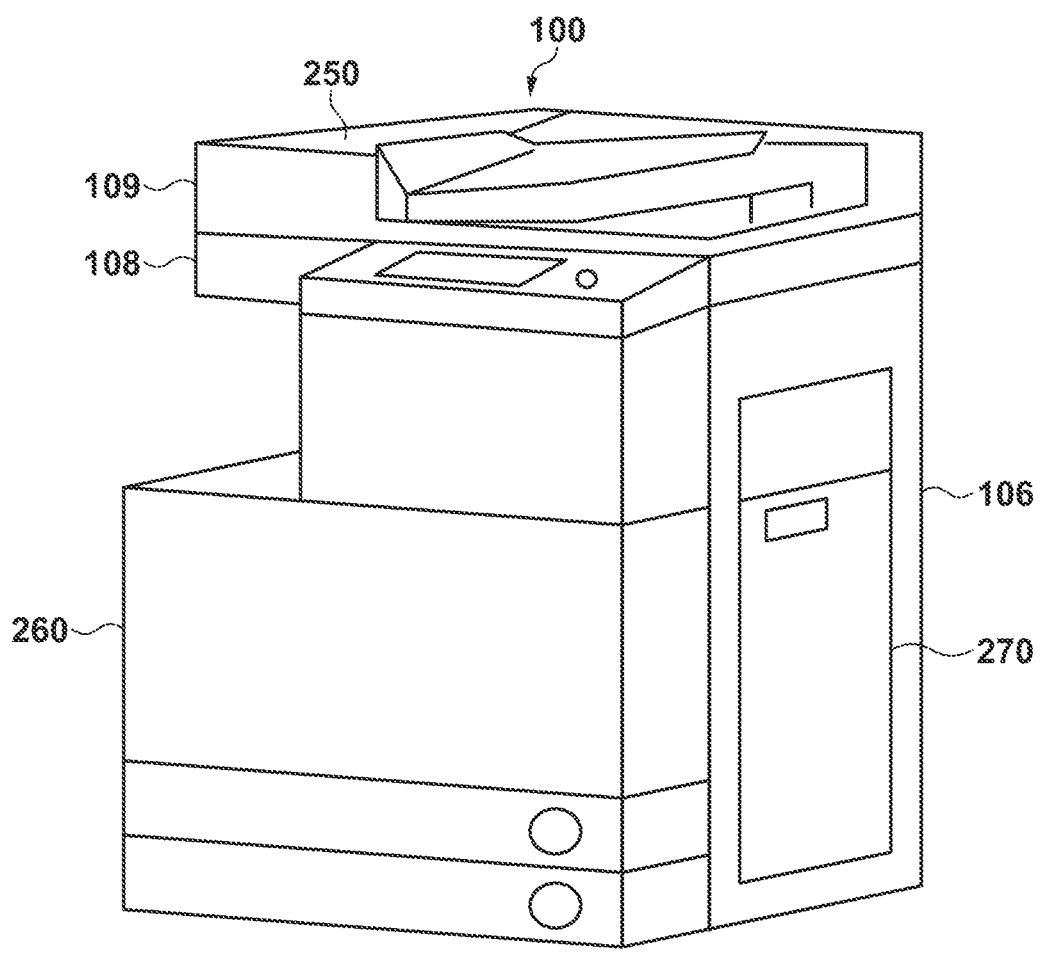
FIG. 2 is a view showing the outer appearance of the image forming apparatus.

FIG. 2 is a view showing the outer appearance of the image forming apparatus 100. FIG. 2 shows an ADF cover 250, a front printer cover 260, and a right printer cover 270 arranged in the image forming apparatus 100. The ADF cover 250 is used to expose the conveyance path of the sheet when a jammed sheet of the original conveyance unit 109 is removed or to expose a portion corresponding to the original feeding roller 204 upon its replacement. The front printer cover 260 is used to expose a portion corresponding to the toner container 12, the recovered toner container 2, or the photosensitive drum 6 when such a consumable part is to be replaced. The right printer cover 270 is used to expose the sheet conveyance path when the jammed sheet of the printer unit 106 is removed or to expose a portion corresponding to the fixing unit 55 upon its replacement. The image forming apparatus 100 includes sensors for detecting the open/closed states of the ADF cover 250, the front printer cover 260, and the right printer cover 270.

Figure 3:
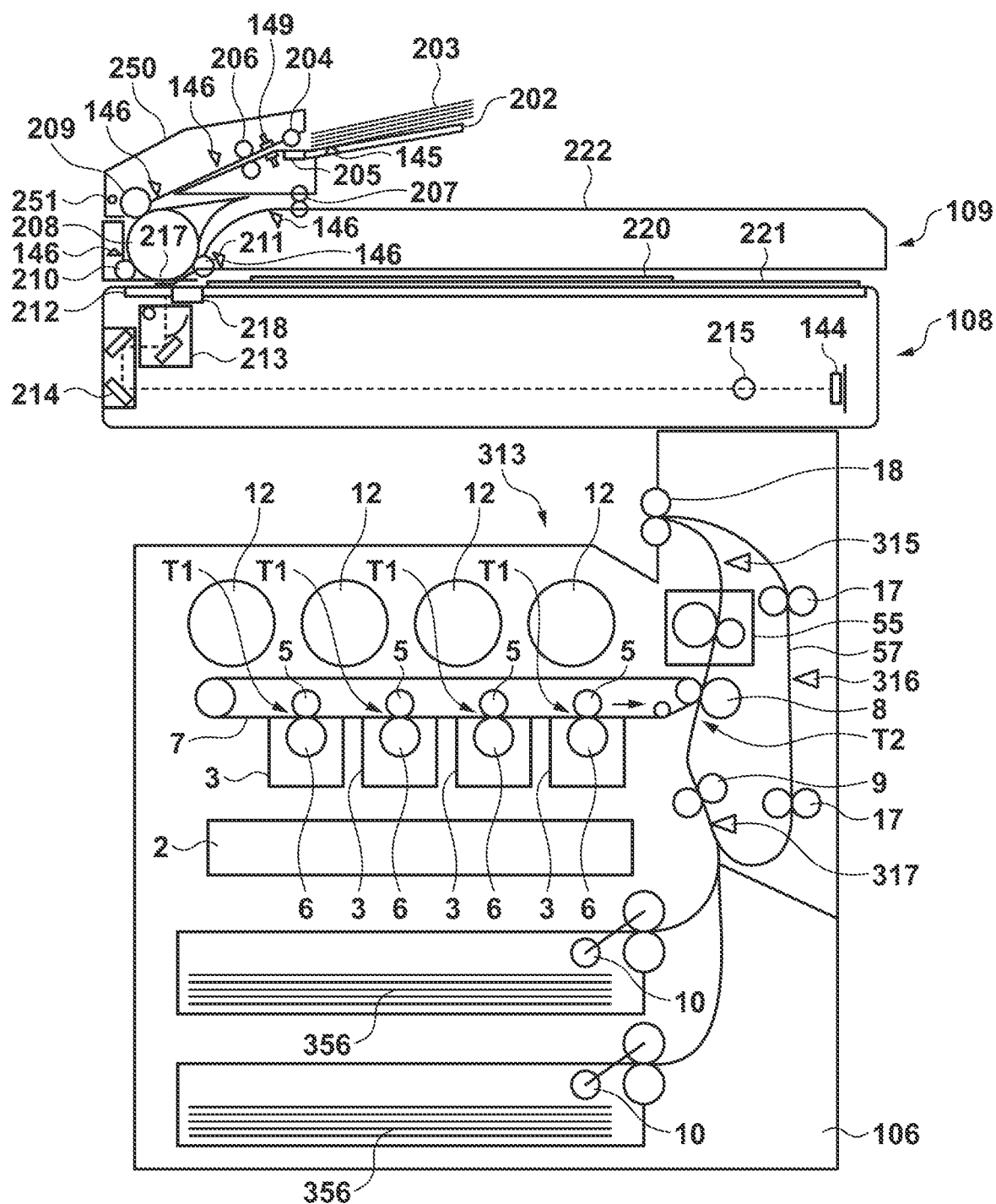
FIG. 3 is a sectional view of the image forming apparatus.

Subsequently, image forming processing and image reading processing in the image forming apparatus 100 will be described below with reference to FIG. 3. FIG. 3 is a sectional view showing an example of the image forming apparatus 100. FIG. 3 shows an example of a full-color image forming apparatus of yellow, magenta, cyan, and black. The image forming apparatus 100 is a so-called tandem type image forming apparatus in which the four photosensitive drums 6 serving as the image carriers for carrying the toner images of colors of yellow, magenta, cyan, and black are aligned along the travel direction of an intermediate transfer belt 7 serving as an intermediate transfer body. The image forming apparatus 100 includes the scanner unit 108, the original conveyance unit 109, and the printer unit 106.

First, the reading operation performed by the scanner unit 108 and the original conveyance unit 109 will be described. If an original detection sensor 145 detects that originals 203 are stacked on a stacking portion 202, the scan is started upon reception of the scan execution instruction from the user. The originals 203 stacked on the stacking portion 202 are conveyed one by one by a pair of the original feeding roller 204 and a separation pad 205. Each conveyed original is fed into the apparatus by conveyance rollers 206. The original conveyed by the conveyance rollers 206 is detected by an original passage detection sensor as one of conveyance sensors 146. It is then determined based on the detection time whether the first original has passed. The original fed into the apparatus by the conveyance rollers 206 is conveyed by a large roller 208 and a roller 209 and further fed by the large roller 208 and a roller 210. The original conveyed between an original glass 212 and an original guide plate 217 in contact with the original glass 212 passes through a jump table 218, is further conveyed by the large roller 208 and a roller 211, and discharged onto a discharge tray 222 by an original discharge roller pair 207. Note that the CPU 101 controls each roller to rotate by driving by a motor to convey the original. The discharge sensor as one of the conveyance sensors 146 detects that the original is discharged onto the discharge tray 222.

In this embodiment, the original feeding roller 204 is set as a consumable part replaceable by the user in consideration of a case in which the original feeding roller 204 is worn due to the influence of the friction force and separation of the original bundle is influenced. Note that the setting is not limited to this, and the pair of the original feeding roller 204 and the separation pad 205 can be set as a consumable part replaceable by the user. In this embodiment, a consumable part replaceable by the user in the original conveyance unit 109 is called an "ADF maintenance kit" hereinafter.

Subsequently, generation of image data will be described below. When an original passes on the original glass 212, the surface of the original contacting the original glass 212 is exposed by an optical unit 213 to read the image of the original with respect to the main scanning direction and the sub-scanning direction. Resultant light reflected by the original is transmitted to a mirror unit 214 via a plurality of mirrors. The transmitted reflected light passes through a lens 215, is condensed by it, and enters a CCD sensor 144. The CCD sensor 144 converts the incident light into a digital signal. The digital signal converted by the CCD sensor 144 is converted into image data, and the image data is transferred to the storage 111.

The scanner unit 108 can also read an original 220 placed on a platen glass 221 (original table). In this case, the original placed on the platen glass 221 is scanned while the optical unit 213 is moved by a motor instead of conveying the original, thereby obtaining one-page image data. The ADF cover 250 is a cover which covers part of the conveyance path of the original conveyance unit 109, pivots about a fulcrum shaft 251, and can be opened/closed. The user opens the ADF cover 250 and can perform a replacement operation of the ADF maintenance kit and the like.

Next, a printing operation performed by the printer unit 106 will be described below. The printer unit 106 includes a mounting portion for mounting toner containers (storage containers) 12 which store the toners of the respective colors and a mounting portion for mounting drum cartridges 3 including the photosensitive drums 6 of the toners of the respective colors. The printer unit 106 also includes exposure units (not shown) for irradiating the photosensitive drums 6 of the respective colors with laser beams and the intermediate transfer belt 7. In addition, the printer unit 106 includes primary transfer rollers 5 serving as the primary transfer portions, secondary transfer rollers 8 serving as the secondary transfer portions, and a mounting portion for mounting the fixing unit 55.

The drum cartridges 3 including the photosensitive drums 6 include the photosensitive drums 6, and chargers (not shown), developing units (not shown), and cleaners (not shown) disposed around the photosensitive drums 6, respectively. Each drum cartridge 3 is replenished with toner from the corresponding toner container 12 via a path (not shown).

The intermediate transfer belt 7 is looped around a plurality of tension rollers, disposed adjacent to the drum cartridges 3, and contacts the respective photosensitive drums 6. This intermediate transfer belt 7 travels in a direction of an arrow in FIG. 3 by rotating and driving any one (driving roller) of the plurality of tension rollers connected to a motor (not shown). The primary transfer rollers 5 are disposed at positions respectively facing the photosensitive drums 6 intermediated by the intermediate transfer belt 7. The secondary transfer rollers 8 are disposed in contact with the intermediate transfer belt 7 on the downstream side of the respective drum cartridges 3 with respect to the travel direction of the intermediate transfer belt 7. The secondary transfer rollers 8 and the intermediate transfer belt 7 form a secondary transfer portion T2. Each exposure unit (not shown) is disposed on the side of each drum cartridge 3 opposite to the intermediate transfer belt 7 and irradiates each photosensitive drum 6 with a laser beam based on a printing target image.

The fixing unit 55 is disposed downstream of the secondary transfer portion T2 to heat and pressurize the printing material which carries the toner image, thereby fixing the toner image on the printing material. In addition, the printer unit 106 includes a plurality of cassettes 356 which store sheets. Each sheet is picked up from each cassette 356 and conveyed to the secondary transfer portion T2 and the fixing unit 55, and the fixed sheet is discharged to a discharge port 313. In addition, the printer unit 106 includes a reversing conveyance mechanism 57 for reversing the sheet and conveying it for double-sided printing.

Subsequently, an image forming process implemented by cooperation of the respective units will be described in detail below. First, the surface of the photosensitive drum 6 of each color is charged with the corresponding charger and exposed by the corresponding exposure unit (not shown). A latent image is formed on the photosensitive drum 6 by exposure of the corresponding exposure unit. The respective latent images are developed by the corresponding developing units, and the toner images are formed on the photosensitive drums 6. The toner images formed on the photosensitive drums 6 reach primary transfer portions T1 where the photosensitive drums 6 contact the intermediate transfer belt 7. When a primary transfer bias is applied to the primary transfer rollers 5 at the primary transfer portions T1, the toner images on the photosensitive drums 6 are sequentially transferred to the intermediate transfer belt 7, thereby forming a full-color toner image on the intermediate transfer belt 7. This toner image is conveyed to the secondary transfer portion T2 by making the intermediate transfer belt 7 travel.

The sheet supplied from each cassette 356 is conveyed toward the secondary transfer portion T2. Each sheet is fed from each cassette 356 by a pickup roller 10, the sheet feed timing is matched with the toner image on the intermediate transfer belt 7 at registration rollers 9, and the sheet is conveyed to the secondary transfer portion T2. When a secondary transfer bias is applied to the secondary transfer roller 8, the toner image on the intermediate transfer belt 7 is transferred to the sheet by secondary transfer at the secondary transfer portion T2. After that, the sheet to which the toner image has been transferred is conveyed to the fixing unit 55. When heat and pressure are applied to the sheet to fuse and mix the toners, the toner image is fixed as a print image on the sheet. The sheet on which the image has been fixed is discharged to the discharge port 313 by discharge rollers 18 arranged downstream of the fixing unit 55, in a state in which the printed surface of the sheet faces downward. In addition, the toner (residual transfer toner) remaining on the surface of each photosensitive drum 6 is removed from the photosensitive drum 6 by the corresponding cleaner after the transfer process and is recovered to the recovered toner container 2. A discharge sensor 315, a double-sided conveyance sensor 316, and a preregistration sensor 317 are sensors for detecting the presence/absence of a printing sheet remaining in the apparatus. These sensors are used to detect the occurrence of the jam in the printer unit 106.

<Management of Life of Consumable Part>

The lives of the consumable parts such as the toner container 12, the recovered toner container 2, the photosensitive drum 6, the fixing unit 55, and the original feeding roller 204 are appropriately managed. In this embodiment, as the maintenance information representing the life of a consumable part or the like, consumption degree information and the remaining operation day count representing the remaining period during which the consumable part can be used are managed.

First, the consumption degree will be described. For example, the consumption degree of the toner container 12 is derived based on the consumable part operation result such as the replenishment count of toner for each drum cartridge 3, remaining amount detection by a sensor (not shown), and the like. When deriving the consumption degree, in addition to the operation result, a dot count for counting the number of color dots of an image to be printed may be taken into consideration. In addition, the consumption degree of the recovered toner container 2, the photosensitive drum 6, the fixing unit 55, original feeding roller 204, or the like is calculated based on the operation result such as a sheet passage count and a travel distance.

Next, the estimation of the remaining operation day count will be described below. The remaining operation day count is estimated based on the consumption degree of each consumable part and the operation day count of each consumable part. For example, the CPU 101 calculates the average consumption amount of each consumable part per day based on the consumption degree of each consumable part and the consumable part operation day count of each consumable part. Subsequently, an estimation value representing the remaining operation day count can be estimated based on the current consumption degree of each consumable part and the average consumption amount. Note that a method of estimating the estimation value representing the remaining operation day count is not limited to this, but the estimation value representing the remaining operation day count can be calculated using multiple linear regression analysis. In addition, a learning model is constructed (this is also referred to as training) by machine learning using each operation result data as input data, and the estimation value representing the remaining operation day count can be estimated using the learned model. Note that learning model construction processing and the estimation processing may be performed upon cooperating with a cloud server (not shown). The consumption degree of each consumable part and the remaining operation day count of each consumable part obtained by the above calculations and estimations are stored in the storage ill.

The consumable parts mounted in the image forming apparatus 100 can be classified into a consumable part of a type for which the CPU 101 can detect the solution of a maintenance event and a consumable part of a type for which the CPU 101 cannot detect the solution of the maintenance event. For example, the replacement frequency of the toner container 12 for storing toner used for image formation and the recovered toner container 2 is high, and the replacement difficulty degree is low. For these reasons, such a consumable part is often arranged as the consumable part of the type for which the CPU 101 can detect the solution of the maintenance event. On the other hand, the replacement frequency of the photosensitive drum 6, the fixing unit 55, and the original feeding roller 204 is low, and the replacement difficulty degree is high. For these reasons, such a consumable part is often arranged as the consumable part of the type for which the CPU 101 cannot detect the solution of the maintenance event.

In this embodiment, the toner container 12 and the recovered toner container 2 will be described as the consumable parts of the type for which the CPU 101 can detect the solution of the maintenance event, but the present invention is not limited to this. In addition, the photosensitive drum 6, the fixing unit 55, and the original feeding roller 204 will be described as the consumable parts of the type for which the CPU 101 cannot detect the solution of the maintenance event, but the present invention is not limited to this.

The CPU 101 detects a maintenance event occurring when a consumable part reaches a replacement timing and displays, on the output unit 115, a notification indicating the replacement of the consumable part to the user in accordance with its detection. As for the consumable part of the type for which the CPU 101 can detect the solution of the maintenance event, if the CPU 101 determines that the maintenance event is solved, the notification for prompting the replacement of the consumable part is not displayed, and at the same time information based on the consumption degree of each consumable part and its remaining operation day count is reset. On the other hand, as for the consumable part of the type for which the CPU 101 cannot detect the solution of the maintenance event, even if the consumable part is replaced, a state in which the notification for prompting the replacement of the consumable part is kept displayed on the output unit 115, and the information indicating the consumption degree of the consumable part and its remaining operation day count is not reset.

This embodiment provides a function of resetting, by a user operation instruction, information based on the consumption degree and remaining operation day count of the consumable part of the type for which the CPU 101 cannot detect the solution of the maintenance event. In addition, this embodiment provides various kinds of mechanisms for performing display control highly convenient to the user when displaying a maintenance screen including moving images indicating a series of work contents necessary for solving the maintenance event of the consumable part.

First, management of the consumption degree and remaining operation day count of each consumable part and a method of resetting the consumption degree and the remaining operation day count will be described with reference to FIG. 4. FIG. 4 is a view showing a consumable part management table 400 stored in the storage 111 shown in FIG. 1. As shown in FIG. 4, the consumable part management table 400 is a table which stores the relationship between the consumable parts, the lives of the consumable parts, whether the types of consumable parts are of the type for which the CPU 101 can detect the solution of the maintenance event, and the cover for exposing a mounting portion upon replacing a consumable part. The consumable part management table 400 stores a consumable part 401, a consumption degree 402, a remaining operation day count 403, an event solution detection flag 404, and a detection target cover 405 in association with each other.

Referring to FIG. 4, the consumable part management table 400 stores, for example, the consumable parts 401 such as the toner container of each color, the recovered toner container, the photosensitive drum of each color, the fixing unit, and the original feeding roller. The consumption degree 402 is a consumption degree until the current time after a predetermined consumable part is mounted in the image forming apparatus 100 and updated upon the above-described calculation processing. The remaining operation day count 403 is a remaining operation day count until a predetermined consumable part reaches the end of its life and updated upon the above-described estimation processing. The event solution detection flag 404 is a flag representing whether a consumable part is of a type for which the CPU 101 can detect the solution of the maintenance event. The CPU 101 displays, on the output unit 115, an optimal maintenance screen for replacing the consumable part based on the value of the flag. If the event solution detection flag 404 is "1", it indicates the consumable part of the type for which the CPU 101 can detect the solution of the maintenance event. If the event solution detection flag 404 is "0", it indicates the consumable part of the type for which the CPU 101 cannot detect the solution of the maintenance event. The detection target cover 405 is a cover for exposing a mounting portion when the corresponding consumable part is replaced. The CPU 101 detects the open/closed state of the detection target cover 405 to switch the display contents of the operation screen and moving image displayed on the output unit 115.

Note that this embodiment exemplifies the table as the data structure for storing the consumable part 401, the consumption degree 402, the remaining operation day count 403, the event solution detection flag 404, and the detection target cover 405 in association with each other. However, the present invention is not limited to this. Another data structure can be stored.

As shown in FIG. 4, the consumption degree and the remaining operation day count corresponding to the toner container 12 of each color are stored in the storage 111. The CPU 101 stops the printing operation performed by the printer unit 106 in accordance with the fact that the consumption degree of one of the toner containers 12 of the respective colors reaches 100%. For example, FIG. 4 shows a case in which the consumption degree 402 of the black toner container 12 has reached 100%. In this case, the image forming apparatus 100 stops the printing operation, and the CPU 101 displays, on the output unit 115, the maintenance screen including the moving image indicating the replacement method of the black toner container 12. At the same time, the consumption degree and remaining operation day count corresponding to the recovered toner container 2 are stored in the storage 111. The CPU 101 stops the printing operation of the printer unit 106 in accordance with the fact that the consumption degree has reached 100%.

In addition, as shown in FIG. 4, the toner container 12 of each color, the event solution detection flag 404 corresponding to the recovered toner container 2, and the detection target cover 405 are stored in the storage 111. Since the toner container 12 of each color and the recovered toner container 2 are arranged as the consumable parts of the type for which the CPU 101 can detect the solution of the maintenance event, the CPU 101 determines whether the maintenance event is solved when it is detected that the detection target cover 405 is closed. The CPU 101 resets the consumption degree 402 and the remaining operation day count 403 of a given consumable part when the maintenance event of the given consumable part is solved.

On the other hand, the consumption degree and the remaining operation day count corresponding to the photosensitive drum 6 of each color are stored in the storage 111. The CPU 101 does not stop the printing operation of the printer unit 106 in accordance with the fact that the consumption degree of one of the photosensitive drums 6 of the respective colors has reached 100%. Similarly, the consumption degree and remaining operation day count corresponding to the fixing unit 55 are stored in the storage 111. The CPU 101 does not stop the printing operation of the printer unit 106 in accordance with the fact that the consumption degree of the fixing unit 55 has reached 100%. Similarly, the consumption degree and remaining operation day count corresponding to the original feeding roller 204 are stored in the storage 111. The CPU 101 does not stop the reading operation of the scanner unit 108 and the original conveyance unit 109 in accordance with the fact that the consumption degree of the original feeding roller 204 has reached 100%. For example, as shown in FIG. 4, since the consumption degree 402 of the original feeding roller 204 has reached 117%, the replacement timing is reached. In this case, the CPU 101 controls to cause a consumable part not to stop the reading operation and controls to cause the output unit 115 to display the maintenance screen including the moving image indicating the replacement method of the original feeding roller 204 in accordance with the user operation instruction.

In addition, as shown in FIG. 4, the event solution detection flags 404 corresponding to the photosensitive drum 6 of each color, the fixing unit 55, and the original feeding roller 204, and the detection target cover 405 are stored in the storage 111. Since the photosensitive drum 6 of each color, the fixing unit 55, and the original feeding roller 204 are arranged as the consumable parts of the type for which the CPU 101 cannot detect the solution of the maintenance event, the CPU 101 displays a confirmation screen to determine whether the replacement is completed when it is detected that the detection target cover is closed. If the CPU 101 determines that the replacement is completed by the user operation instruction on the confirmation screen for determining whether the replacement is completed, the CPU 101 resets the consumption degree 402 and the remaining operation day count 403 of the corresponding consumable part are reset.

<Data Structure of Moving Image Displayed Upon Occurrence of Maintenance Event>

The data structure of moving images indicating a series of work contents necessary for solving the maintenance event of a consumable part will then be described. FIG. 5 shows a data arrangement view defining the relationship between the maintenance event and the moving image, and the data arrangement is stored in the storage 111 shown in FIG. 1.

Figure 5A:
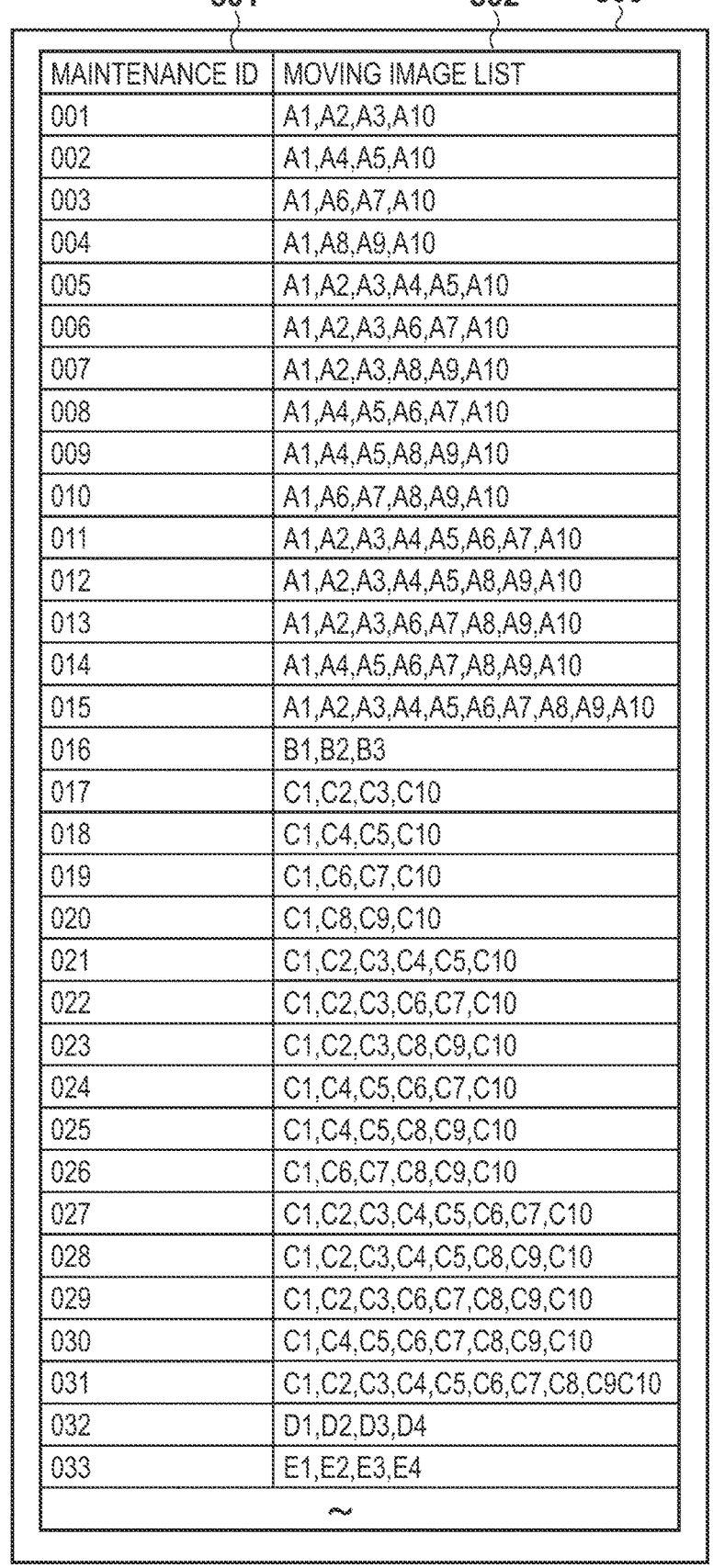

FIG. 5A is a view showing a moving image list table 500. The moving image list table 500 is a table which defines the relationship between maintenance events such as the absence of toner and the full state of recovered toner and moving images to be played back upon detection of occurrence of a corresponding maintenance event. The moving image list table 500 stores maintenance IDs 501 and moving image lists 502 in association with each other. Each maintenance ID is identification information for identifying a maintenance event occurring in the image forming apparatus 100.

Referring to FIG. 5A, maintenance ID 001 indicates the absence of black toner, maintenance ID 002 indicates the absence of yellow toner, maintenance ID 003 indicates the absence of magenta toner, and maintenance ID 004 indicates the absence of cyan toner. The printer unit 106 detects these states. Maintenance IDs 005 to 010 indicate the absence of toners of two colors, maintenance IDs 011 to 014 indicate the absence of toners of three colors, and maintenance ID 015 indicates the absence of toners of all colors. The printer unit 106 detects these states. Note that the "absence of toner" is not limited to a case in which the toner is used up, and includes a case in which the remaining toner amount is less than a predetermined threshold. Maintenance ID 016 indicates the full state of recovered toner. This is also detected by the printer unit 106.

Maintenance ID 017 indicates a black photosensitive drum life, maintenance ID 018 indicates a yellow photosensitive drum life, maintenance ID 019 indicates a magenta photosensitive drum life, and maintenance ID 020 indicates a cyan photosensitive drum life. The printer unit 106 detects these states. Maintenance IDs 021 to 026 indicate the lives of the photosensitive drums of two colors, maintenance IDs 027 to 030 indicate the lives of the photosensitive drums of three colors, and maintenance ID 031 indicates the lives of the photosensitive drums of all colors. These are also detected by the printer unit 106. Maintenance ID 032 indicates the life of the fixing unit. This is also detected by the printer unit 106. On the other hand, maintenance ID 033 indicates the life of the original feeding roller. This is detected by the original conveyance unit 109.

The moving image list 502 indicates a list of moving images to be played back upon occurrence of each maintenance event. If a maintenance event occurs, a series of work contents (consumable part replacement method) necessary for solving the corresponding maintenance event must be presented to the user. For example, a plurality of work contents such as work for opening a cover, work for removing an old consumable part, work for mounting a new consumable part, and work for closing the cover are included in the series of work contents. In the following description, a moving image for each of the work contents is called a "partial moving image". The moving image list 502 stores a combination of a plurality of partial moving images and the playback order of the partial moving images in association with the maintenance ID 501. The combination of partial moving images is given by partial moving images A1, A2, A3, and A10 indicated by the corresponding moving image list 502 for, for example, the absence of black toner. The playback order is the order named. The partial moving images are played back in the order of A1, A2, A3, and A10 for the absence of black toner. Similarly, for the cases of the full state of recovered toner and the life of the photosensitive drum, a plurality of partial moving images corresponding to the occurring maintenance event are played back in the order of the moving image list 502.

FIGS. 5B-1 and 5B-2 are views showing a moving image table 510. The moving image table 510 is a table for associating a moving image ID 511, a moving image file 512, a playback time 513, a cover opening/closing flag 514, and a message 515 with each other.

The moving image ID 511 is an ID for identifying a partial moving image and is also used in the moving image list 502 in the above moving image list table 500. The moving image file 512 indicates the file name of a partial moving image to be played back and the storage position of the partial moving image file in the storage 111. Note that the partial moving image file is stored in the storage 111, but may be stored in a server connected via a network or an external device such as a storage device connected via a USB cable and read out as needed. A playback time 513 indicates a playback time until the playback of a partial moving image ends upon its playback.

The cover opening/closing flag 514 indicates a partial moving image indicating work before a cover for exposing the mounting portion of a consumable part is opened or a partial moving image indicating work after the cover for exposing the mounting portion of the consumable part is opened. If the cover opening/closing flag 514 is "0", it indicates the partial moving image indicating the work before the cover is opened. If the cover opening/closing flag 514 is "1", it indicates the partial moving image showing the work after the cover is opened. The message 515 indicates a message displayed while the corresponding partial moving image is being played back.

Referring to FIGS. 5B-1 and 5B-2, the work contents indicated by each partial moving image file are as follows. The work contents for opening the front printer cover 260 are displayed in partial moving image A1. The work contents for removing an empty black toner container are displayed in partial moving image A2. The work contents for mounting a new black toner container are displayed in partial moving image A3. The work contents for removing an empty yellow toner container are displayed in partial moving image A4. The work contents for mounting a new yellow toner container are displayed in partial moving image A5. The work contents for removing an empty magenta toner container are displayed in partial moving image A6. The work contents for mounting a new magenta toner container are displayed in partial moving image A7. The work contents for removing an empty cyan toner container are displayed in partial moving image A8. The work contents for mounting a new cyan toner container are displayed in partial moving image A9. The work contents for closing the front printer cover 260 are displayed in partial moving image A10.

The work contents for opening the front printer cover 260 are displayed in partial moving image B1. The work contents for removing an old recovered toner container are displayed in partial moving image B2. The work contents for mounting a new recovered toner container and closing the front printer cover 260 are displayed in partial moving image B3.

The work contents for opening the front printer cover 260 are displayed in partial moving image C1. The work contents for removing an old black photosensitive drum are displayed in partial moving image C2, and the work contents for mounting a new black photosensitive drum are displayed in partial moving image C3. The work contents for removing an old yellow photosensitive drum are displayed in partial moving image C4, and the work contents for mounting a new yellow photosensitive drum are displayed in partial moving image C5. The work contents for removing an old magenta photosensitive drum are displayed in partial moving image C6, and the work contents for mounting a new magenta photosensitive drum are displayed in partial moving image C7. The work contents for removing an old cyan photosensitive drum are displayed in partial moving image C8, and the work contents for mounting a new cyan photosensitive drum are displayed in partial moving image C9. The work contents for closing the front printer cover 260 and pressing the replacement completion key indicating the completion of the replacement of the photosensitive drum are displayed in partial moving image C10.

The work contents for opening the right printer cover 270 are displayed in partial moving image D1. The work contents for removing an old fixing unit are displayed in partial moving image D2. The work contents for mounting a new fixing unit are displayed in partial moving image D3. The work contents for closing the right printer cover 270 and pressing the replacement completion key indicating the completion of the replacement of the fixing unit are displayed partial moving image D4.

The work contents for opening the ADF cover 250 are displayed in partial moving image E1. The work contents for removing an old original feeding roller are displayed in partial moving image E2. The work contents for mounting a new original feeding roller are displayed in partial moving image E3. The work contents for closing the ADF cover 250 and pressing the replacement completion key indicating the completion of the replacement of the original feeding roller are displayed partial moving image E4.

A description will be returned for the moving image list 502 in FIG. 5A. For example, if the black toner absence occurs (the maintenance ID is 001), partial moving image A1 indicating the work for opening the front printer cover 260 is first played back. Subsequently, partial moving images A2, A3, and A10 are played back in this order. The images indicating the work for solving the maintenance event of the black toner absence are partial moving images A2, A3, and A10. Partial moving image A1 can be said to indicate the preparation for solving the maintenance event of the black toner absence.

In the following description, a partial moving image indicating the work contents to be performed before the work for actually solving the maintenance event will be called a "preparation moving image". In addition, the work for solving the maintenance event, that is, the partial moving image indicating the work performed after the work indicated by the preparation moving image is performed, is called a "main moving image". For example, if the maintenance ID is 001, partial moving image A1 is set as the preparation moving image, and partial moving images A2, A3, and A10 are set as main moving images. If the maintenance ID is 016, partial moving image B1 is set as the preparation moving image, and partial moving images B2 and B3 are set as main moving images. In this embodiment, the partial moving image whose cover opening/closing flag 514 is "0" is set as the preparation moving image, and the partial moving image whose cover opening/closing flag 514 is "1" is set as the main moving image.

Subsequently, a screen displayed when the maintenance event of a consumable part occurs will be described below. FIGS. 6A to 6H, and 9A to 9E are views showing the screen examples displayed on the output unit 115 according to this embodiment. An overall image of transition of the display screens in this embodiment will now be described with reference to FIGS. 6A to 6H, and 9A to 9E. The screens in FIGS. 6A to 6H, and 9 are displayed on the output unit 115 via the output control unit 114 based on display data generated by causing the CPU 101 to execute programs stored in the storage 111.

<Replacement Procedure of Consumable Part of Type which can Detect Solution of Maintenance Event>

Detailed control to be performed when displaying the replacement procedure of a consumable part of a type for which it is possible to detect the solution of a maintenance event will be described with reference to FIGS. 6A to 6H and 7. FIGS. 6A to 6H show a transition example of screens when the CPU 101 can display, on the output unit 115, the replacement procedure of a consumable part of a type for which it is possible to detect the solution of the maintenance event. An example in which the black toner absence occurs as the maintenance event of the consumable part of the type for which it is possible to detect the solution of the maintenance event (the maintenance ID is 001) will be described below.

As shown in each screen in FIGS. 6A to 6H, a screen made from a main display region and a status display region 609 is displayed on the output unit 115. The status display region 609 is a region for displaying a message corresponding to the maintenance event occurring in the image forming apparatus 100. If a plurality of maintenance events occur, the messages corresponding to the maintenance events are alternately displayed in the status display region 609. FIGS. 6A to 6H show an example in which a message "A toner (black) runs out. Please replace the black toner container." is displayed in the status display region 609 as an example of a notification of the black toner absence.

Figure 6A:
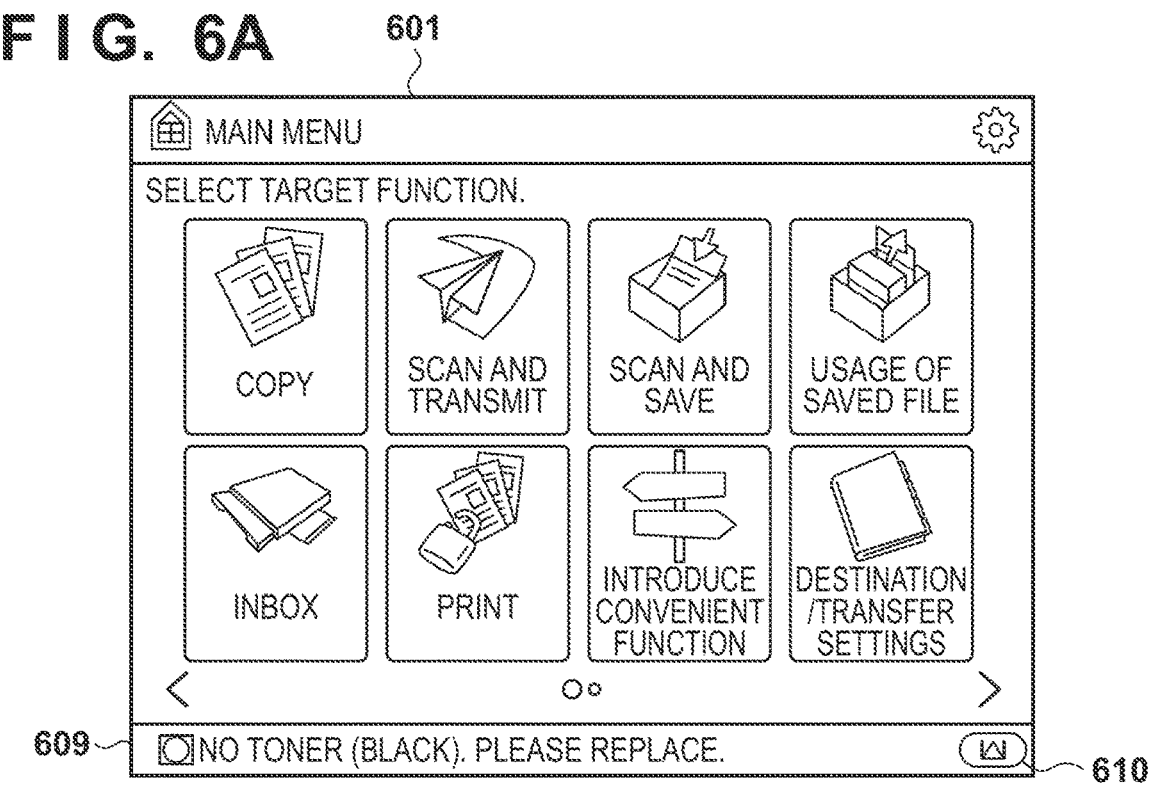
Figure 6B:
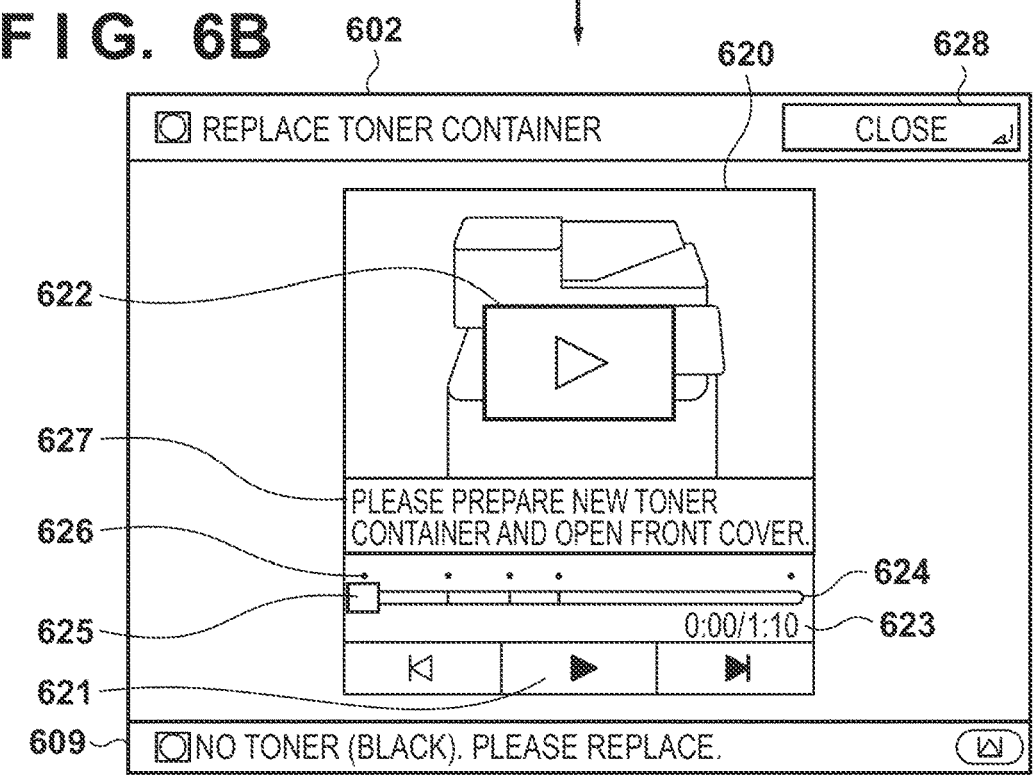
Figure 6C:
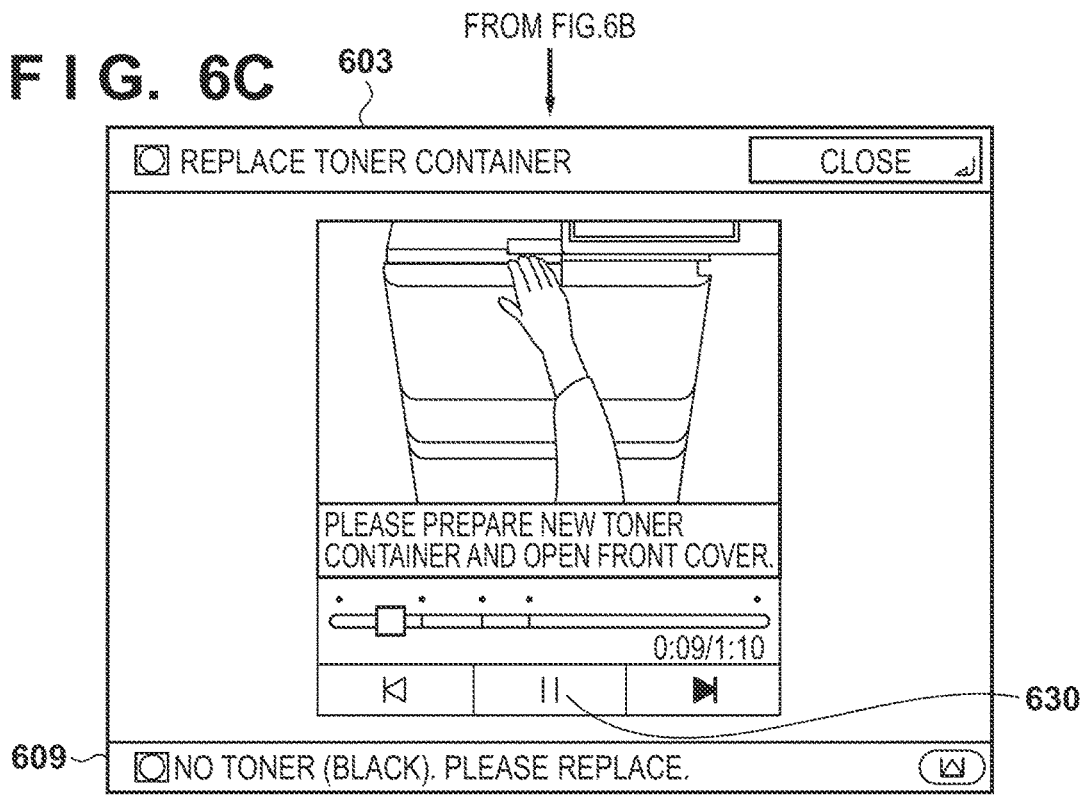
Figure 6D:
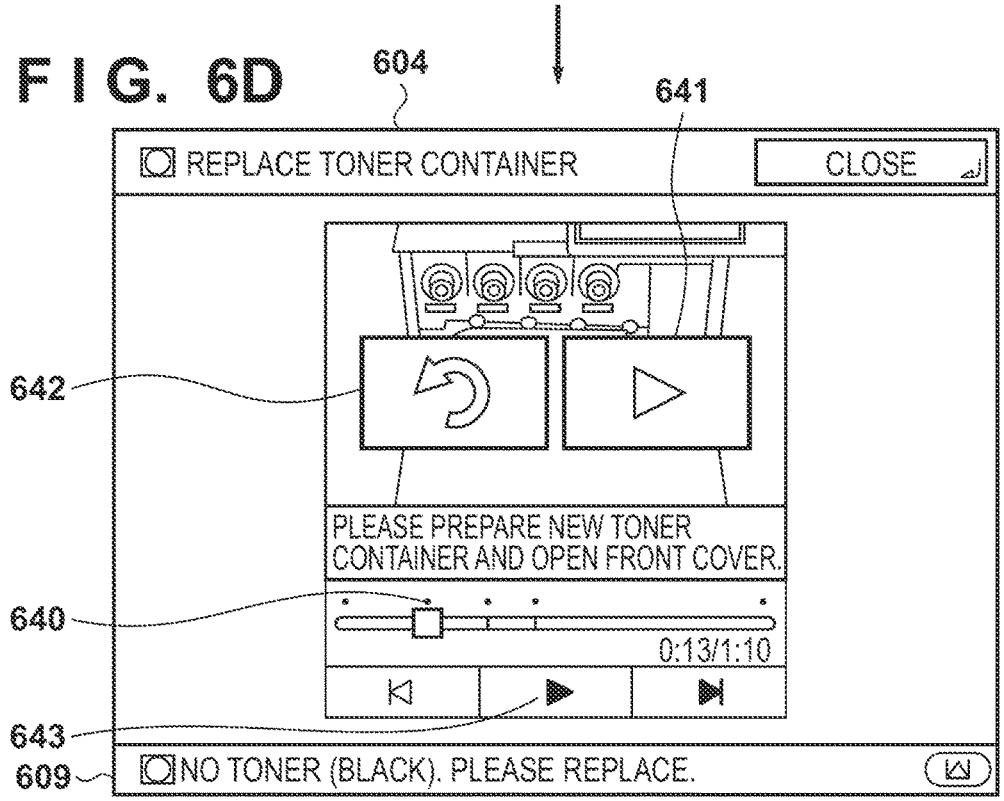
Figure 6G:
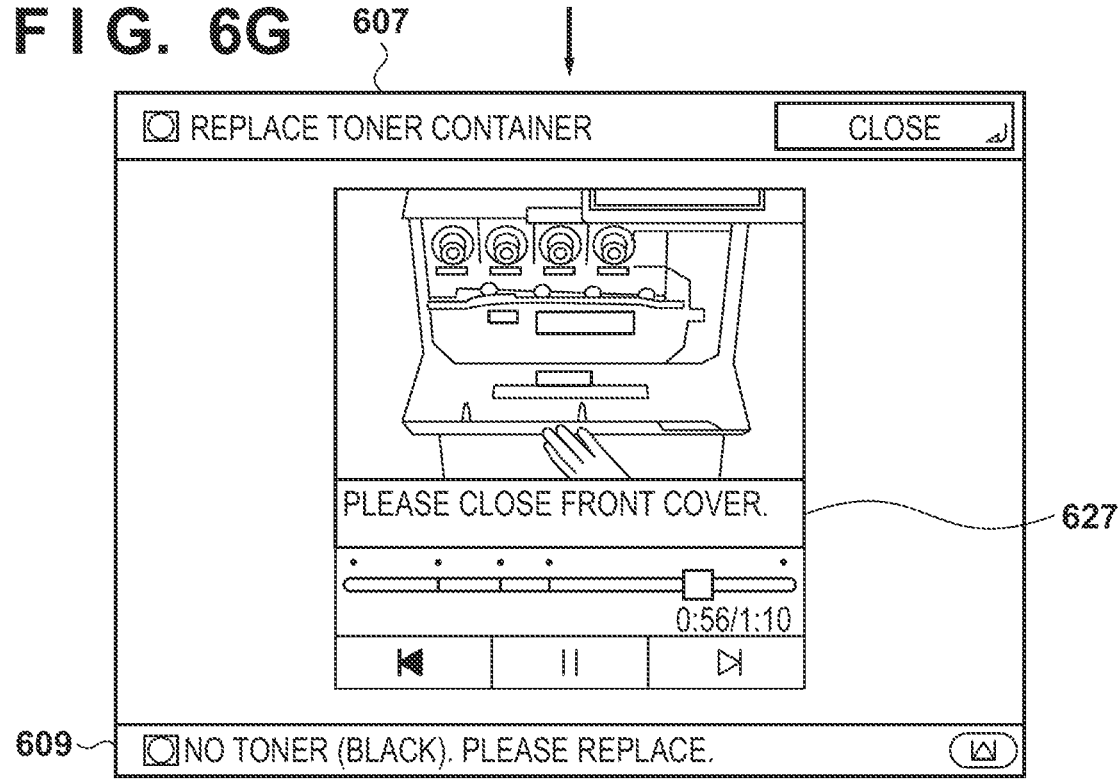
Figure 6H:
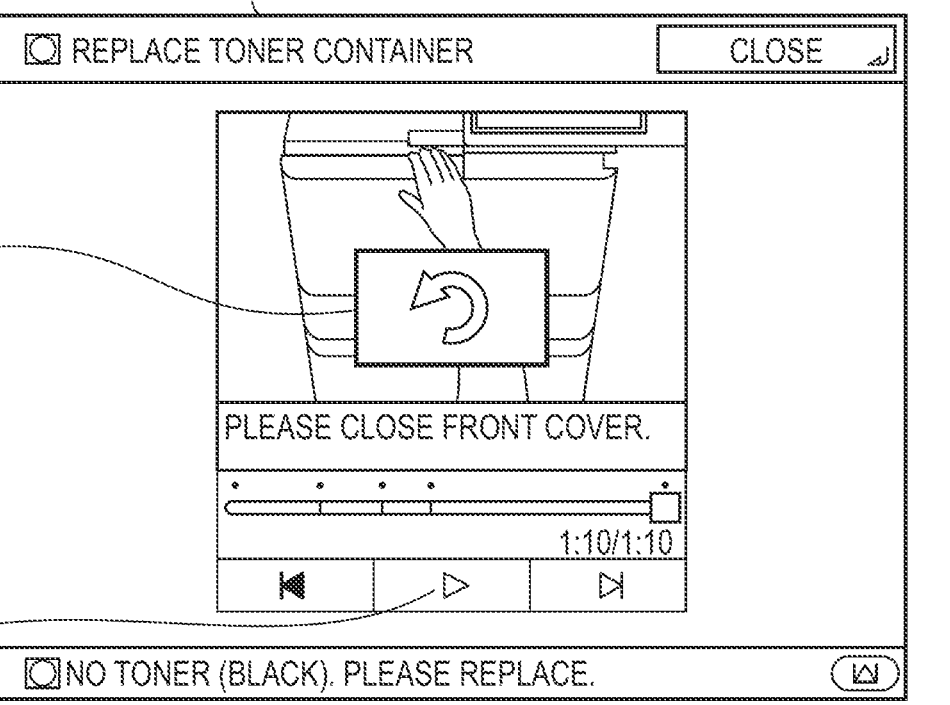

A screen 601 in FIG. 6A shows an example of a main menu screen displayed when the image forming apparatus 100 is activated. Screens 602 to 608 show examples of maintenance screens including a moving image indicating the replacement method of the black toner container 12.

If the CPU 101 detects that a replacement procedure key 610 shown in the screen 601 is pressed by the user, the maintenance screen 602 is displayed on the output unit 115. The maintenance screen 602 is an example of the maintenance screen first displayed when pressing of the replacement procedure key 610 by the user is detected. If the maintenance ID is 001, the partial moving images whose moving image IDs are A1, A2, A3, and A10 are played back in this order according to the moving image list table 500. In the maintenance screen 602, a screen in a state in which partial moving image A1 as the preparation moving image stops at the start is displayed. A moving image display region 620, a playback key 621, a playback mark 622, a playback time display label 623, a bar 624, a slider 625, a chapter 626, a message region 627, and a close key 628 are displayed in the maintenance screen 602.

The moving image display region 620 is a region for displaying a moving image indicating the replacement method of the consumable part. The playback key 621 is a key for instructing the playback of the moving image. The playback mark 622 is a mark for instructing the playback of the moving image as in the playback key 621. If the playback key 621 or the playback mark 622 is pressed (touched), the CPU 101 starts the playback of the moving image. The playback time display label 623 indicates a sum (to be referred to as a "total playback time" hereinafter) of a plurality of partial moving images to be played back and a time corresponding to the current playback position corresponding to the total playback time. The bar 624 and the slider 625 indicate the playback position in the entire moving image and form a seek bar for instructing the movement of the playback position. The bar 624 schematically indicates the total playback time. The slider 625 indicates the current playback position and is used to instruct the movement of the playback position. The slider 625 moves within the range of the bar 624 in accordance with the playback state of the moving image. In addition, by dragging (moving) the slider 625, the playback position can be moved to an arbitrary position. In addition, if an arbitrary position of the bar 624 is pressed, the playback of the moving image can be changed to the pressed position, and the slider 625 is also moved according to its playback position. The chapter 626 indicates the delimiter position of the moving image.

The playback time display label 623 and the chapter 626 will be described in detail. If the maintenance ID is 001, partial moving images A1, A2, A3, and A10 are played back in this order according to the moving image list table 500. According to the moving image table 510, the playback times of these partial moving images are 13 sec (00:13), 10 sec (00:10), 30 sec (00:30), and 17 sec (00:17), respectively. Since the total playback time is the sum of the playback times of the partial moving images to be played back, the total playback time is 1 min and 10 sec (01:10). On the other hand, the playback time indicates the current playback position with respect to the total playback time. For example, assume that a scene after the elapse of 5 sec (00:05) from the start of partial moving image A1 to be replayed back first is displayed. In this case, the playback time is directly 5 sec. Assume that a scene after the elapse of 10 sec from the start of partial moving image A2 to be played back as the second image is displayed. In this case, since the playback of partial moving image A1 ends, the playback time is 23 sec (00:23) by adding the playback time of 13 sec of A1 and the played time of 10 sec of A2. The playback time display label 623 is displayed as a character string obtained by connecting the calculated playback time and the calculated total playback time by a slash (/).

In addition, the chapter 626 is displayed at the delimiter position among a series of work contents. The chapters 626 are displayed at three positions (A1 and A2, A2 and A3, and A3 and A10) where playback of the partial moving images is changed. The chapters 626 may be displayed at two positions, that is, the start and end of the entire moving image. The maintenance screen 602 indicates a case in which the chapters 626 are displayed at five positions.

A message for capturing the contents of the partial moving image which is being played back is displayed in the message region 627. More specifically, when partial moving image A1 is being played back, a message "Please prepare a new toner container and open the front cover." is displayed based on the message 515 in the moving image table 510. Note that the message region 627 may be set in a non-display state a predetermined time after the start of playback of the corresponding partial moving image or may be kept displayed while the corresponding partial moving image is kept displayed. The close key 628 is a key for stopping display of the maintenance screen 602 which is being displayed. If the CPU 101 detects that the close key 628 is pressed by the user, the screen 601 is displayed on the output unit 115.

If the playback key 621 or the playback mark 622 is pressed in the maintenance screen 602, playback of the moving image is started. If the maintenance ID is 001, the CPU 101 starts the playback of partial moving image A1 serving as the preparation moving image. The maintenance screen 603 displays a screen example 9 sec after the start of the playback of partial moving image A1. Upon the start of the playback of the moving image, the display of the playback key 621 and the playback mark 622 is stopped. A pause key 630 is displayed at the same position of the playback key 621 in place of the playback key 621.

The maintenance screen 604 shows a screen example when the playback position is the end of partial moving image A1. When the playback of partial moving image A1 ends, that is, at the position of a chapter 640, the playback of the moving image is automatically paused. A replay mark 642 is then displayed together with a playback mark 641. The display of the pause key 630 is stopped, and a play key 643 is displayed at the same position of the pause key 630. The replay mark 642 is a mark for instructing the playback from the start of the partial moving image which is currently stopped. More specifically, during the stop at the position of the chapter 640, when the replay mark 642 is pressed, the position is moved to the start of the partial moving image A1 by the CPU 101, thereby restarting the playback of the moving image.

The maintenance screen 605 is a screen example displayed when it is detected that the front printer cover 260 serving as a cover for exposing the mounting portion of the consumable part during the playback of partial moving image A1 is opened. If it is detected that the front printer cover 260 is opened, the CPU 101 automatically ends the playback of partial moving image A1 and displays a screen in a state in which the image is stopped at the start (a chapter 650) of A2 serving as the first partial moving image of the main moving image. In this case, only a playback mark 651 is displayed. By displaying only the playback mark 651, this prompts the user to observe the moving image of the work to be performed next. The message region 627 displays a message "Please remove the black toner container." corresponding to partial moving image A2. Note that if the front printer cover 260 has already been opened, partial moving image A1 need not be played back again, and no replay mark is displayed.

In this manner, in the display procedure of a moving image displayed upon occurrence of a maintenance event, if the work displayed by the preparation moving image is completed, the process automatically advances (skips) to the main moving image, and thus the user can advance to the next work with security.

In the screen such as the maintenance screen 604 or the maintenance screen 605, if playback mark 641 or 651 or the playback key 643 is pressed, the playback of partial moving image A2 is started. The maintenance screen 606 is a screen example 23 sec after the start of the playback of partial moving image A3. In the maintenance screen 606, a message "Please set a new black toner container to the deep position." corresponding to partial moving image A3 is displayed in the message region 627.

The maintenance screen 607 is a screen example 3 sec after the start of the playback of partial moving image A10. In the maintenance screen 607, a message "Please close the front cover." corresponding to partial moving image A10 is displayed in the message region 627. If the maintenance screen 608 is a screen example when the playback position is the end of the entire moving image (if the maintenance ID is 001, the playback position is the end of partial moving image A10). In this case, there is no partial moving image to be displayed next. Only a replay mark 680 is displayed, and no playback mark is displayed. In addition, a playback key 681 is grayed out because it is set in an inoperative state.

As described above, when the plurality of partial moving images corresponding to the maintenance events which have occurred are played back until the end, a screen different from that set when the playback of the moving image is paused midway is displayed, and the user can recognize that the moving image is played back to the end.

Note that in this embodiment, the maintenance screen 602 is displayed on the output unit 115 in accordance with the operation instruction by the user, but the present invention is not limited to this. As in the maintenance event of the black toner absence, the maintenance screen 602 can be displayed on the output unit 115 when the CPU 101 detects the occurrence of the maintenance event for stopping the image forming operation.

Figure 7A:
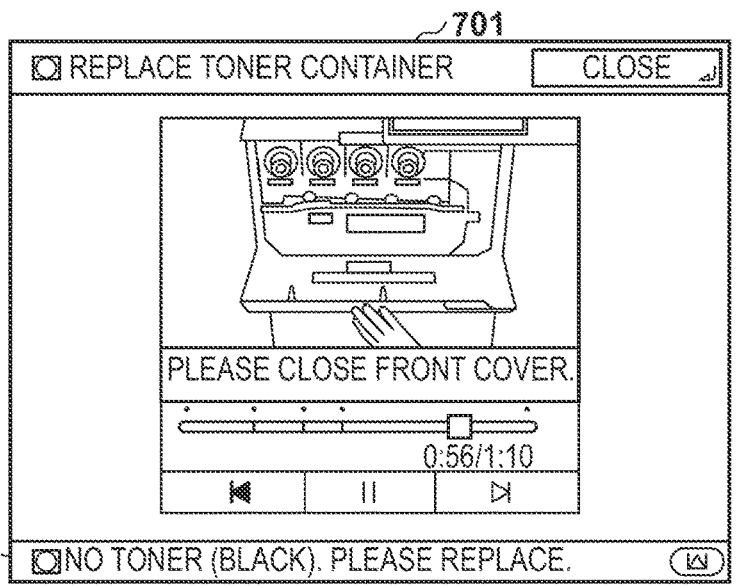
FIGS. 7A to 7C are views showing screen transition displayed on an output unit of the image forming apparatus.
Figure 7B:
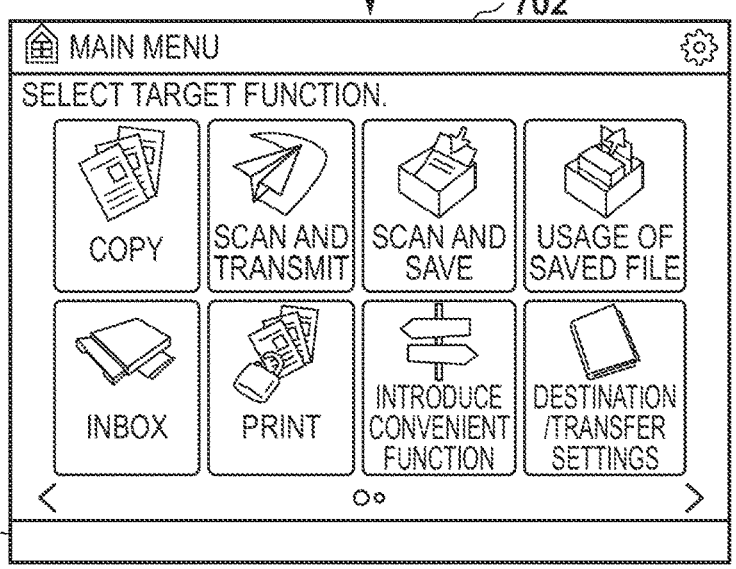
Figure 7C:
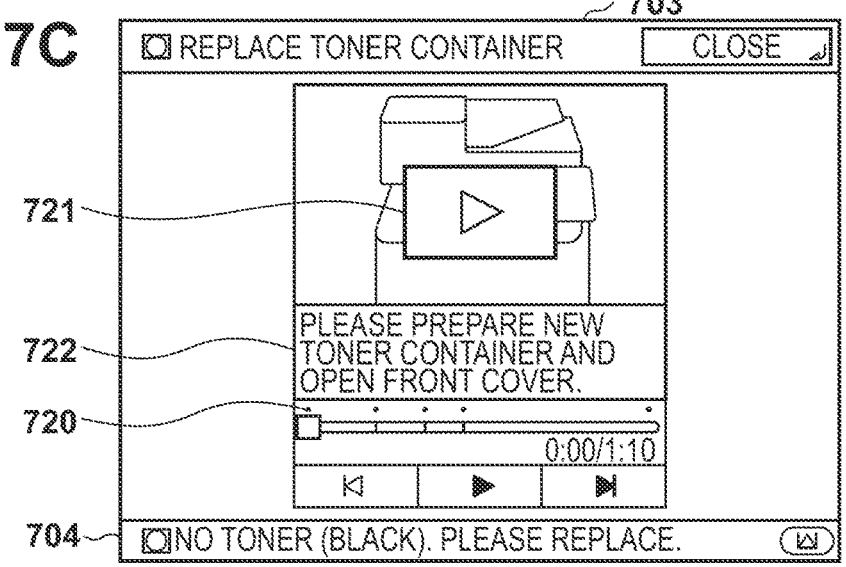

FIGS. 7A to 7C show a transition example of screens when the cover for exposing the mounting portion of the consumable part is closed while the CPU 101 causes the output unit 115 to display the replacement procedure of the consumable part of the type for which it is possible to detect the solution of the maintenance event. As in FIGS. 6A to 6H, a case in which the occurrence of the black toner absence as the maintenance event is detected (the maintenance ID is 001) is exemplified.

A maintenance screen 701 is a screen example 3 sec after the start of the playback of partial moving image A10. When the CPU 101 detects that the front printer cover 260 serving as the detection target cover is closed during the playback of partial moving image A10, the playback of partial moving image A10 automatically ends, and the CPU 101 determines whether the maintenance event of the black toner absence is solved.

If the CPU 101 determines that the maintenance event of the black toner absence is solved, the CPU 101 resets the consumption degree 402 and the remaining operation day count 403 of the corresponding consumable part shown in the consumable part management table 400. The CPU 101 displays the main menu screen 702 on the output unit 115. In addition, as shown in a main menu screen 702, the CPU 101 stops displaying a message "The toner (black) runs out. Please replace the black toner container." corresponding the black toner absence notification displayed in a status display region 704 of the maintenance screen 701.

On the other hand, if the CPU 101 determines that the maintenance event of the black toner absence is not solved, a maintenance screen 703 in a state in which the moving image is stopped at the start of A1 (a chapter 720) serving as the partial moving image of the preparation moving image is displayed. In this case, only a playback mark 721 is displayed. Displaying only the playback mark 721 can prompt the user to observe the moving image of the work to be performed next by the user. A message "Please prepare a new toner container and open the front cover." corresponding to partial moving image A1 is displayed in a message region 722.

<Replacement Procedure of Consumable Part of Type for which it is not Possible to Detect Solution of Maintenance Event>

Detailed control when the replacement procedure of the consumable part of the type for which it is not possible to solve the solution of the maintenance event is displayed will be described with reference to FIGS. 8A to 9E. FIGS. 8A to 8H show a transition example of screens when the CPU 101 causes the output unit 115 to display the replacement procedure of the consumable part of the type for which it is not possible to detect the solution of the maintenance event. In this case, an example in which occurrence of the maintenance event of the end of the black photosensitive drum life as the maintenance event of the consumable part of the type for which it is not possible to detect the solution of the maintenance event (the maintenance ID is 017) is detected will be described below.

As shown in each screen of FIGS. 8A to 8H, a screen including a main display region and a status display region 809 is displayed on the output unit 115. A case in which a message "Please replace the drum (black)." as an example of the black photosensitive drum life notification is displayed in the status display region 809 is exemplified in FIGS. 8A to 8H.

Figure 8A:
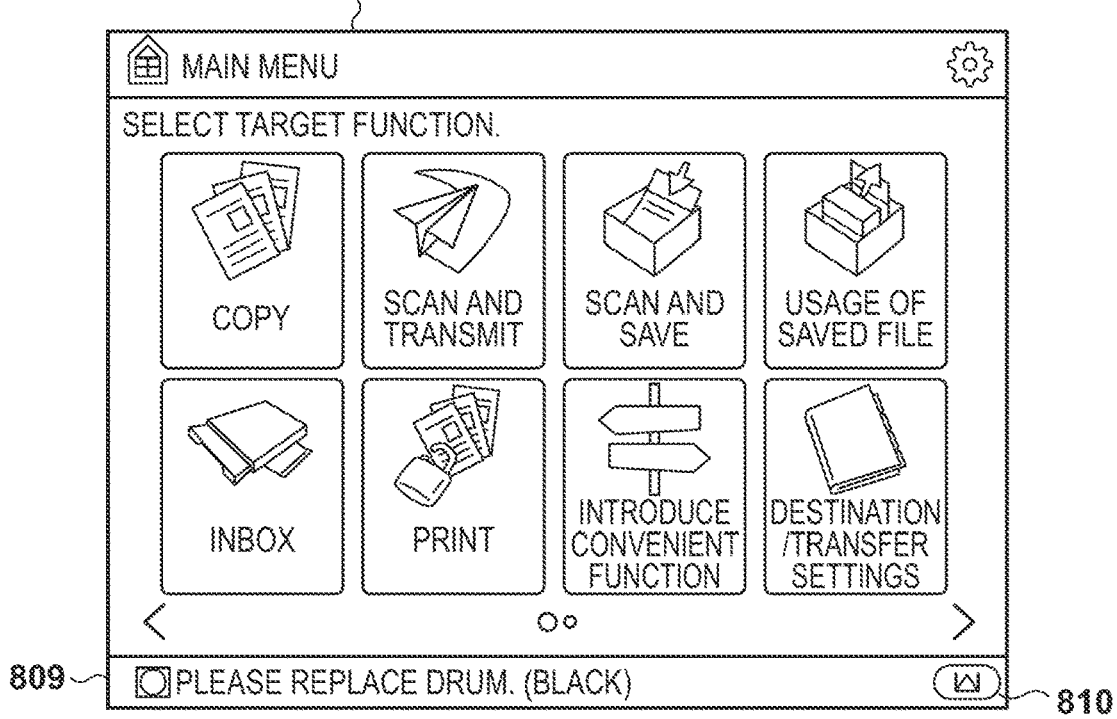
FIGS. 8A to 8H are views showing screen transition displayed on an output unit of the image forming apparatus.
Figure 8B:
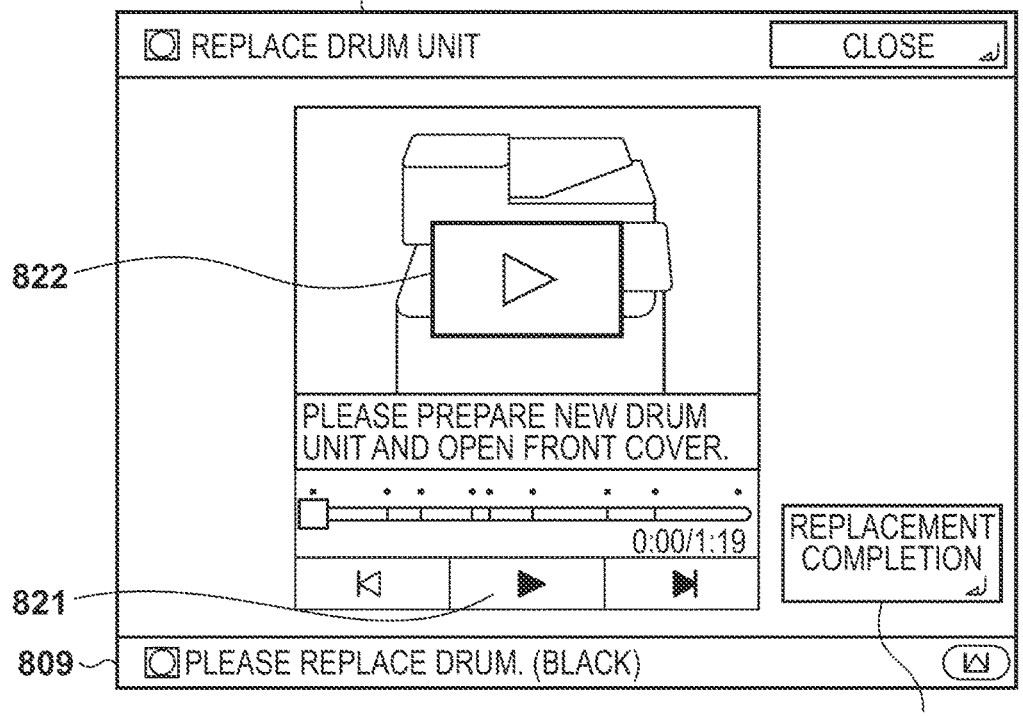
Figure 8C:
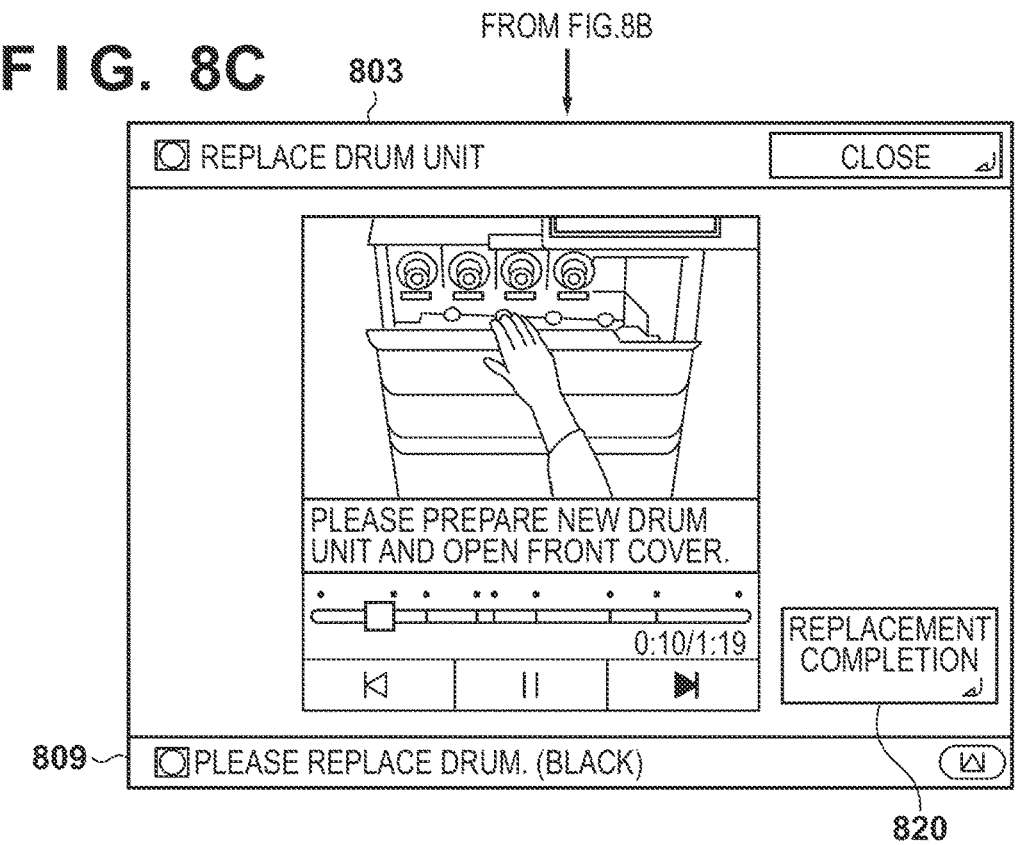
Figure 8D:
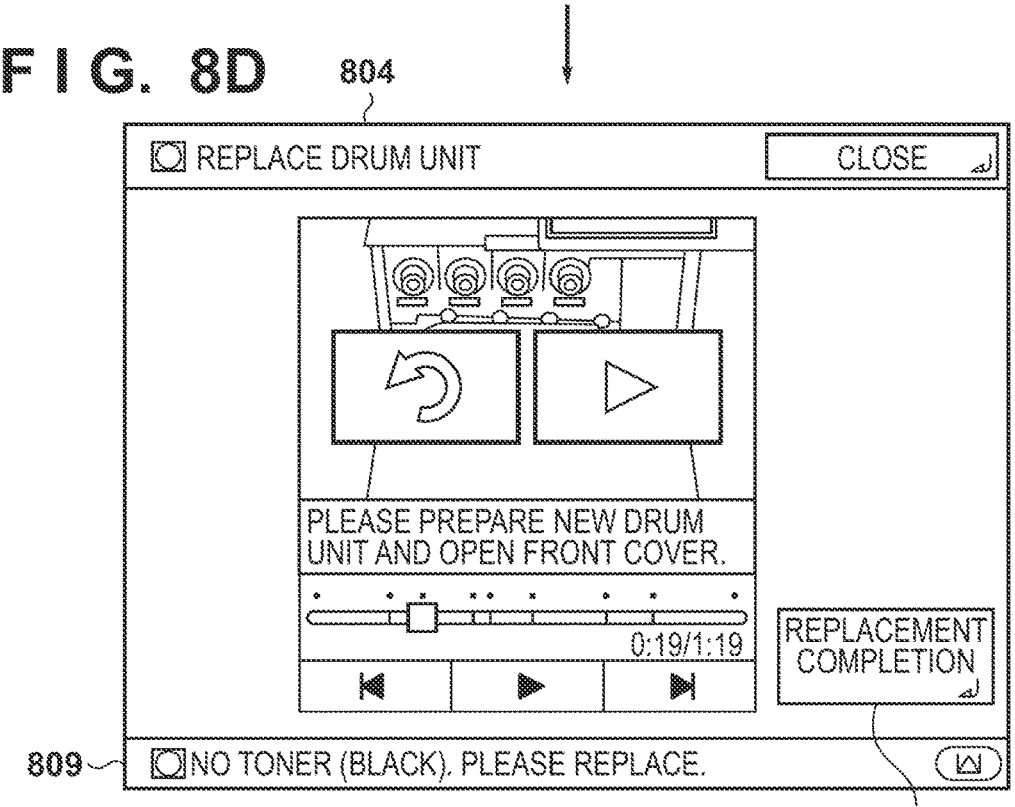

Referring to FIG. 8A, a screen 801 is an example of a main menu screen displayed when the image forming apparatus 100 is activated. Screens 802 to 808 are examples of the maintenance screens including the moving images showing the replacement method of the black photosensitive drum 6. If the CPU 101 detects that the user presses a replacement procedure key 810 shown in the main menu screen 801, the maintenance screen 802 is displayed on the output unit 115.

The maintenance screen 802 is an example of the maintenance screen displayed first when the CPU 101 detects that the user presses the replacement procedure key 810. If the maintenance ID is 017, the partial moving images whose moving image IDs are C1, C2, C3, and C10 are played back in this order according to the moving image list table 500. In each of the maintenance screens 802 to 808, a replacement completion key 820 characteristic as the consumable part of the type for which it is not possible to detect the solution of the maintenance event is displayed. The replacement completion key 820 is a key for displaying the confirmation screen for determining whether the replacement of the consumable part is completed. If the replacement completion key 820 is pressed, the CPU 101 causes the output unit 115 to display the confirmation screen (to be described later) to determine whether the replacement of the consumable part is completed. A screen in a state in which the moving image is stopped at the start of partial moving image C1 serving as the preparation moving image is displayed on the screen 802.

When a playback key 821 or a playback mark 822 is pressed in the maintenance screen 802, the playback of the moving image is started. If the maintenance ID is 017, the CPU 101 starts the playback of partial moving image C1 serving as the preparation moving image. The maintenance screen 803 is a screen example 10 sec after the start of the playback of partial moving image C1. The maintenance screen 804 is a screen example when the playback position reaches the end of partial moving image C1. The maintenance screen 805 is a screen example displayed when the CPU 101 detects that the front printer cover 260 serving as a cover for exposing the mounting portion of the consumable part is opened during the playback of partial moving image C1. When the CPU 101 detects that the front printer cover 260 is open, the CPU 101 automatically ends the playback of partial moving image C1 and displays a screen in a state in which the moving image is stopped at the start of C2 serving as the first partial moving image of the main moving image. The maintenance screen 806 is a screen example 4 sec after the start of the playback of partial moving image C3. The maintenance screen 807 is a screen example 12 sec after the start of the playback of partial moving image C10. The maintenance screen 808 is a screen example when the playback position reaches the end of the entire moving image (if the maintenance ID is 017, the playback position reaches the end of partial moving image C10).

FIGS. 9A to 9E are a transition example of screens when a cover for exposing the mounting portion of the consumable part is closed while the CPU 101 causes the display unit 115 to display the replacement procedure of the consumable part of the type for which it is not possible to detect the solution of the maintenance event. As in FIGS. 8A to 8H, a case in which occurrence of the end of the black photosensitive drum life as the maintenance event (the maintenance ID is 017) is detected will be described below.

A maintenance screen 901 is a screen example 12 sec after the start of the playback of partial moving image C10. If the CPU 101 detects that the front printer cover 260 serving as the detection target cover is closed during the playback of partial moving image C10, the playback of partial moving image C10 automatically ends. A confirmation screen 902 confirming whether the replacement of the consumable part is completed is displayed on the output unit 115. A confirmation message region 920, a return key 921, and a replacement completion key 922 are displayed on the replacement completion confirmation screen 902.

A message confirming whether the replacement of the consumable part is completed is displayed to the user in the confirmation message region 920 of the replacement completion confirmation screen 902. Since the CPU 101 detects occurrence of the end of the life of the black photosensitive drum when the replacement completion confirmation screen 902 is displayed, a message for prompting the user to confirm whether the replacement of the black photosensitive drum is completed is displayed in the confirmation message region 920.

The return key 921 is a key for displaying the maintenance screen on the output unit 115 again. If the return key 921 is pressed in the replacement completion confirmation screen 902, since the front printer cover 260 serving as the detection target cover is kept closed, a maintenance screen 903 in a state in which the moving image is stopped at the start (a chapter 930) of C1 serving as the partial moving image of the preparation moving image is displayed. In this case, only a playback mark 931 is displayed. Displaying only the playback mark 931 can prompt the user to observe the moving image of the work to be performed next by the user. A message "Please prepare a new drum unit and open the front cover." corresponding to partial moving image C1 is displayed in a message region 932.

The replacement completion key 922 is a key which can accept an instruction input indicating that the user completes to replace a consumable part. If the CPU 101 determines that the replacement completion key 922 is pressed, the consumption degree 402 and the remaining operation day count 403 of the corresponding consumable part indicated in the consumable part management table 400 are reset, and a replacement completion screen 904 is displayed on the output unit 115. In addition, as shown in the replacement completion screen 904, the CPU 101 stops displaying a message "Please replace the drum (black)." corresponding to the black photosensitive drum life end notification displayed in a status display region 906 of the maintenance screen 901. The CPU 101 displays the replacement completion screen 904 on the output unit 115 for the time being and then displays a main menu screen 905 on the output unit 115.

A replacement completion key 910 characteristic as the consumable part of the type for which it is not possible to detect the solution of the maintenance event is displayed in each of the maintenance screens 901 and 903. The replacement completion key 910 is a key which can accept a display instruction for displaying the confirmation screen to confirm whether the replacement of the consumable part is completed. If the replacement completion key 910 is pressed, the CPU 101 displays the replacement completion confirmation screen 902 on the output unit 115.

Figure 10:
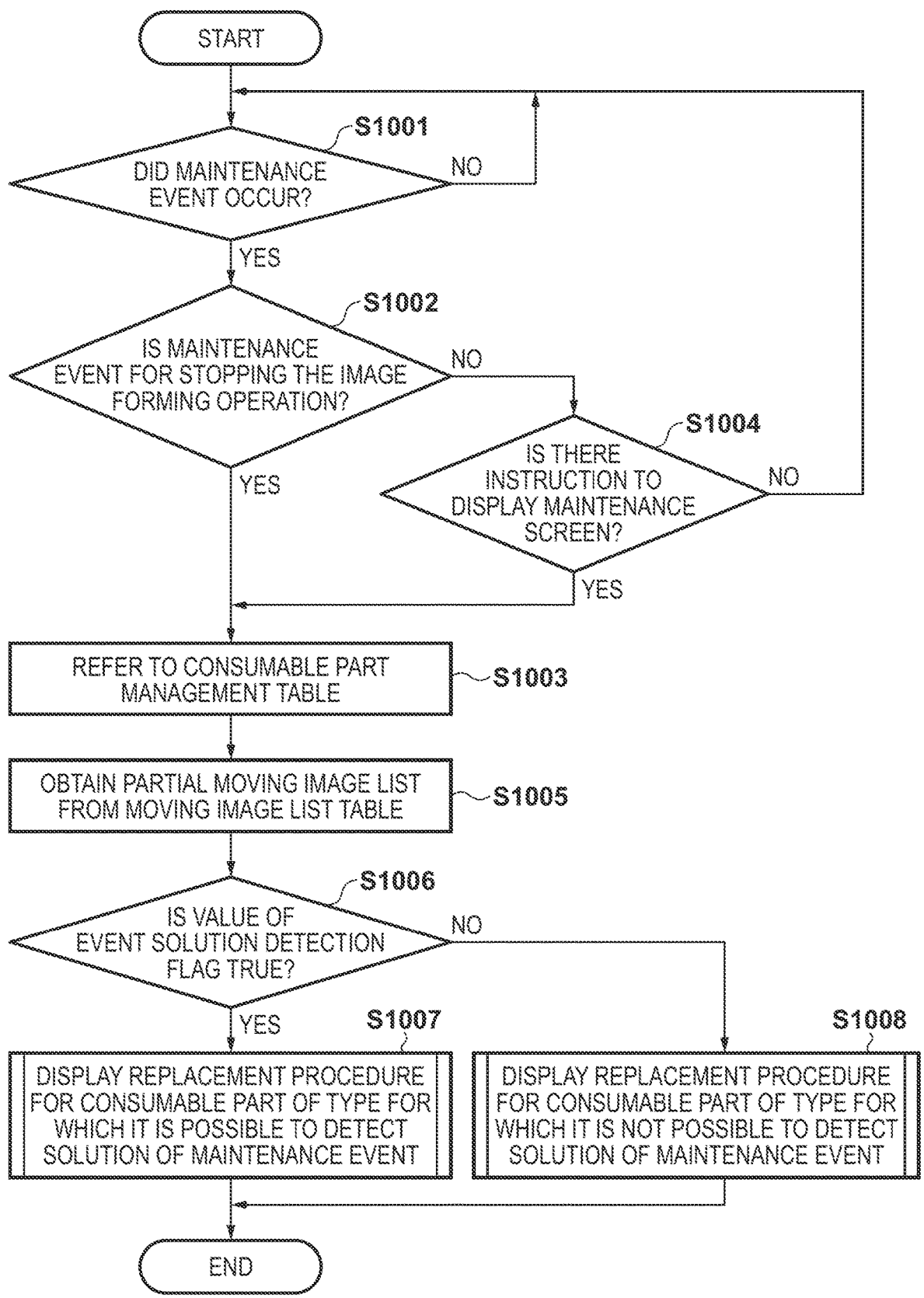
FIG. 10 is a flowchart showing display control processing in the image forming apparatus.
Figure 11:
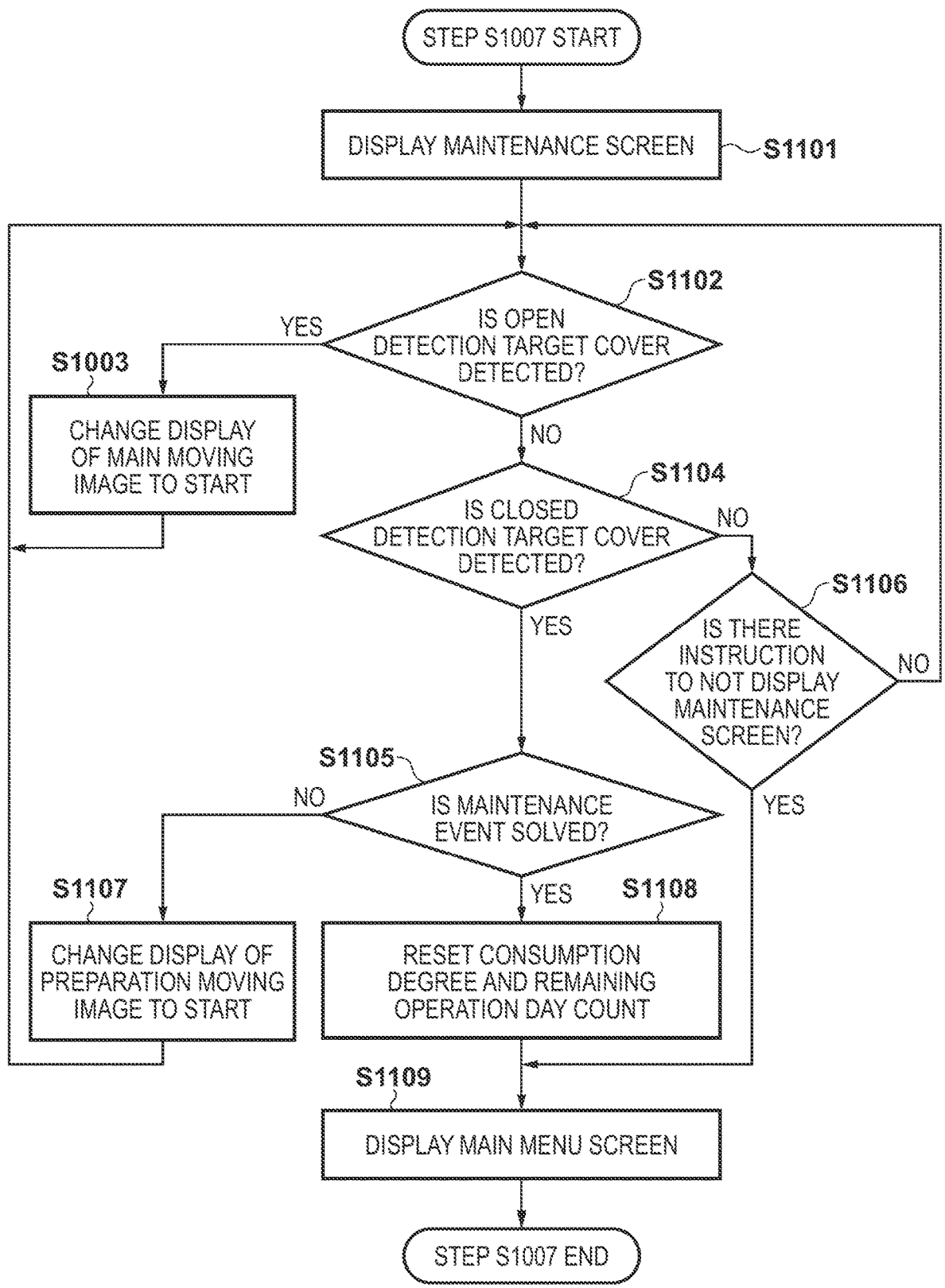
FIG. 11 is a flowchart showing display control processing in the image forming apparatus.
Figure 12:
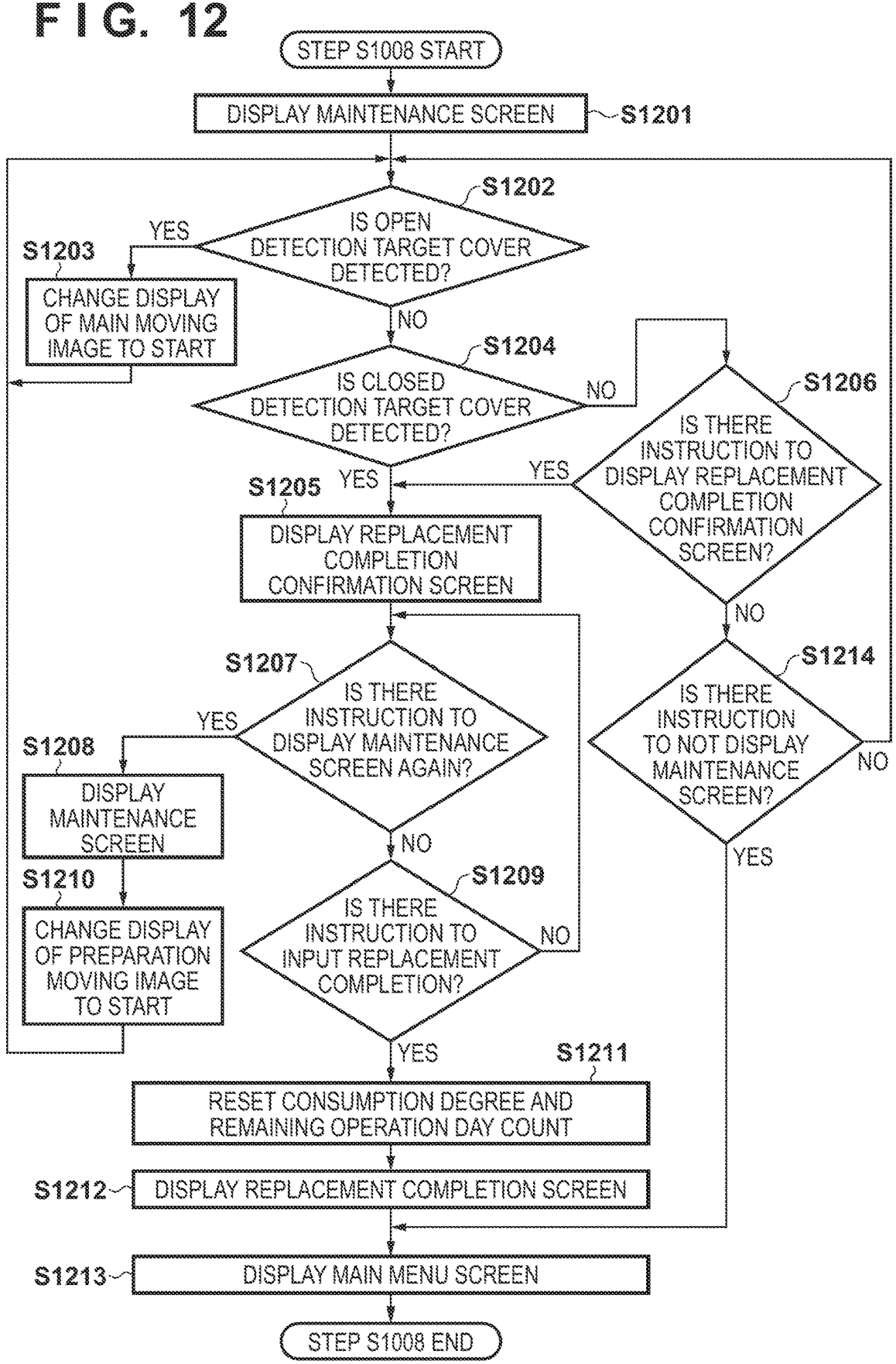
FIG. 12 is a flowchart showing display control processing in the image forming apparatus.

An operation of the image forming apparatus 100 for the screen display control described with reference to FIGS. 6A to 6H, and 9A to 9E will be described below. FIGS. 10 to 12 are flowcharts showing the control of the image forming apparatus 100. The processes shown in the flowcharts of FIGS. 10 to 12 are implemented by causing the CPU 101 to read out the programs for implementing the respective control modules stored in the ROM 102 or the storage 111 into the RAM 104 and execute the programs. Note that in this embodiment the processes associated with display are implemented by cooperating with hardware such as the input unit 113 and the output unit 115.

The flowchart in FIG. 10 exemplifies display control after the main menu screen 702 in FIG. 7B is displayed on the output unit 115 of the image forming apparatus 100. In step S1001, the CPU 101 determines whether a maintenance event such as toner absence, a recovered toner full state, a photosensitive drum life end, a fixing unit life end, or an original feeding roller life end occurs. Note that the toner absence, the recovered toner full state, the photosensitive drum life end, and the fixing unit life end are detected by the printer unit 106, and the original feeding roller life end is detected by the original conveyance unit 109.

It is determined in step S1001 whether any maintenance event occurs (event detection), the CPU 101 specifies a maintenance ID for identifying the detected maintenance event. For example, if the black toner absence occurs, the CPU 101 specifies the maintenance ID as 001. The CPU 101 then advances the process to step S1002.

The CPU 101 determines in step S1002 whether the maintenance event which has occurred is a maintenance event for stopping the image forming operation. For example, the CPU 101 determines whether a maintenance event for which it is not possible to continue the image forming operation, such as the black toner absence, occurs. If it is determined in step S1002 that the maintenance event which has occurred is the maintenance event for stopping the image forming operation, the CPU 101 advances the process to step S1003.

In step S1003, the CPU 101 refers to the consumable part management table 400 exemplified in FIG. 4 and obtains the event solution detection flag 404 of the consumable part corresponding to the maintenance event which has occurred, and information of the detection target cover 405. For example, if the consumable part is the black toner container, the event solution detection flag 404 is "1", and the detection target cover 405 is set as the front printer cover. If the consumable part is the black photosensitive drum, the event solution detection flag 404 is "0", and the detection target cover 405 is set as the front printer cover.

On the other hand, if it is determined that the maintenance event which has occurred in step S1002 is not the maintenance event for stopping the image forming operation, the CPU 101 advances the process to step S1004. If the CPU 101 determines in step S1004 whether there is a display instruction for a maintenance screen indicating the replacement method of the consumable part. For example, the CPU 101 determines whether the replacement procedure key 810 is pressed on the main menu screen 801 shown in FIG. 8A. If it is determined in step S1004 that there is the display instruction for the maintenance screen indicating the replacement method of the consumable part, the CPU 101 advances the process to step S1003. On the other hand, if there is no instruction for displaying the maintenance screen in step S1004, the process returns to step S1001.

Next, in step S1005, the CPU 101 refers to the moving image list table 500 and obtains a partial moving image list corresponding to the maintenance ID specified in step S1001. For example, if the specified maintenance ID is 001, the partial moving images to be played back are A1, A2, A3, and A10. Also, if the specified maintenance ID is 017, the partial moving images to be played back are C1, C2, C3, and C10. The CPU 101 temporarily stores the plurality of specified partial moving images as, for example, array information in the RAM 104 in the playback order.

The CPU 101 determines in step S1006 whether the value of the event solution detection flag 404 obtained in step S1003 is "TRUE". In this case, "TRUE" corresponds to "1" in FIG. 4, and "NOT TRUE" corresponds to "0" in FIG. 4. If the flag is "1", the process advances to step S1007. On the other hand, if the event solution detection flag 404 is "0", the process advances to step S1008.

Next, in step S1007, the CPU 101 performs screen generation and display processing if the replacement procedure of the consumable part of the type for which it is possible to detect the solution of the maintenance event is displayed. Detailed control will be described using the flowchart in FIG. 11.

First, in step S1101, the CPU 101 loads the partial moving image corresponding to the start moving image ID into the RAM 104 and displays, on the output unit 115, the maintenance screen in a state in which the partial moving image is stopped. For example, if the maintenance ID is 001, the CPU 101 loads partial moving image A1 serving as the preparation moving image into the RAM 104 and displays the maintenance screen in the stop state on the output unit 115. After that, as described with reference to FIGS. 6A to 6H, the playback of the moving image is started in accordance with the playback start operation by the user.

The CPU 101 determines in step S1102 whether the detection target cover 405 obtained in step S1003 is opened (whether the state is changed from the closed state to the open state). For example, if the maintenance event of the black toner absence (the maintenance ID is 001) occurs, it is determined whether the front printer cover 260 is opened. If it is determined that the detection target cover 405 obtained in step S1003 is opened, the CPU 101 advances the process to step S1103. On the other hand, if it is determined in step S1102 that the detection target cover 405 is not changed from the closed state to the open state, the CPU 101 advances the process to step S1104.

In step S1103, the CPU 101 loads, into the RAM 104, the first partial moving image indicating the work contents after the cover is opened, based on the cover opening/closing flag 514 of the moving image table 510. The CPU 101 then displays the loaded partial moving image in the stop state on the output unit 115 to change the display to the start of the main moving image, and returns to the processing in step S1102. For example, if the maintenance ID is 001, the start of the main moving image, that is, the first partial moving image whose cover opening/closing flag 514 is "1" is A2. In this manner, the maintenance screen 605 shown in FIG. 6E is displayed on the output unit 115.

The CPU 101 determines in step S1104 whether the detection target cover 405 obtained in step S1003 is closed (whether the cover is changed from the open state to the closed state). For example, if the maintenance event of the black toner absence (the maintenance ID is 001) occurs, it is determined whether the front printer cover 260 is closed. In this case, if it is determined that the detection target cover 405 obtained in step S1003 is closed, the CPU 101 advances the process to step S1105. On the other hand, it is determined in step S1104 that the detection target cover 405 is not changed from the open state to the closed state, the CPU 101 advances the process to step S1106.

The CPU 101 determines in step S1106 whether there is a non-display instruction for the maintenance screen indicating the replacement method of the consumable part. For example, the CPU 101 determines whether the close key 628 is pressed in the maintenance screen 602 shown in FIG. 6B.

If it is determined in step S1106 that there is the non-display instruction of the maintenance screen indicating replacement method of the consumable part, the CPU 101 advances the step to step S1109. On the other hand, if it is determined in step S1106 that there is no non-display instruction of the maintenance screen indicating the replacement method of the consumable part, the CPU 101 returns the process to step S1102.

Next, the CPU 101 determines in step S1105 whether the maintenance event which has occurred is solved. For example, if the black toner absence occurs, and the front printer cover 260 is closed during the playback of the corresponding moving image, the CPU 101 determines whether the black toner absence is solved by the printer unit 106.

If it is determined in step S1105 that the maintenance event which has occurred is not solved, the CPU 101 advances the process to step S1107 and changes the display to the start of the preparation moving image, and the process returns to step S1102. For example, if the maintenance event of the black toner absence (the maintenance ID is 001) has occurred, the display is changed from the maintenance screen 701 to the maintenance screen 703 in FIGS. 7A to 7C. On the other hand, if it is determined in step S1105 that the maintenance event which has occurred is solved, the CPU 101 advances the process to step S1108 and resets the consumption degree 402 and the remaining operation day count 403 of the corresponding consumable part.

Next, in step S1109, the CPU 101 stops displaying the maintenance screen which has been displayed so far and displays the main menu screen on the output unit 115. For example, if the maintenance event of the black toner absence (the maintenance ID is 001) is solved, the display is changed from the maintenance screen 701 in FIG. 7A to the main menu screen 702 in FIG. 7B. In this manner, the display processing performed when the replacement procedure of the consumable part of the type for which it is possible to detect the solution of the maintenance event ends.

Subsequently, in step S1008, the CPU 101 performs screen generation and display processing when the replacement procedure of the consumable part of the type for which it is not possible to detect the solution of the maintenance event is displayed. The detailed control will be described with reference to the flowchart in FIG. 12.

First, in step S1201, the CPU 101 loads the partial moving image corresponding to the start moving image ID into the RAM 104 and displays, on the output unit 115, the maintenance screen in a state in which the partial moving image is stopped. For example, if the maintenance ID is 017, the CPU 101 loads partial moving image C1 serving as the preparation moving image into the RAM 104 and displays it in the stop state on the output unit 115. After that, as described with reference to FIGS. 8A to 8H, the playback of the moving image is started in accordance with the start of the playback by the user.

The CPU 101 determines in step S1202 whether the detection target cover 405 obtained in step S1003 is opened (the state is changed from the closed state to the open state). For example, if the maintenance event of the black photosensitive drum life end (the maintenance ID is 017) has occurred, it is determined whether the front printer cover 260 is opened. In this case, if it is determined that the detection target cover 405 obtained in step S1003 is opened, the CPU 101 advances the step to step S1203. On the other hand, if it is determined in step S1202 that the detection target cover 405 is not changed from the closed state to the open state, the CPU 101 advances the process to step S1204.

Figure 8E:
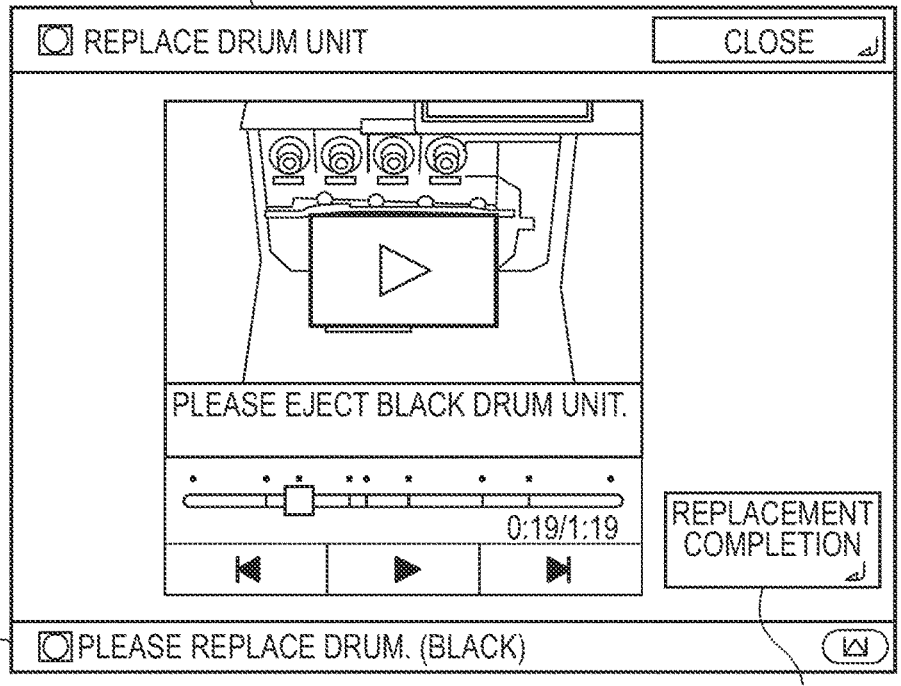
Figure 8F:
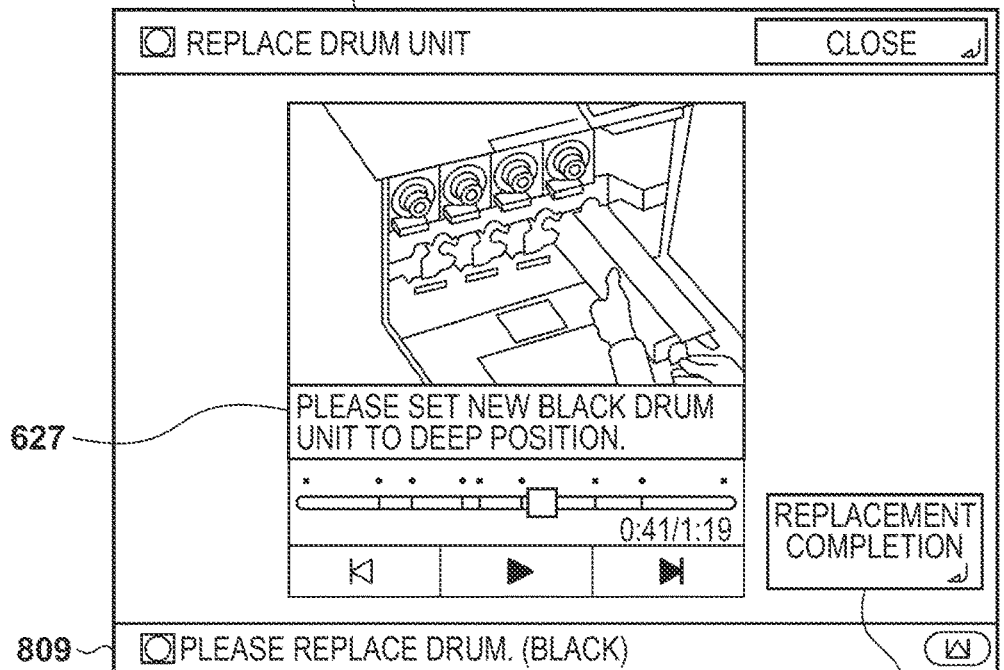
Figure 8G:
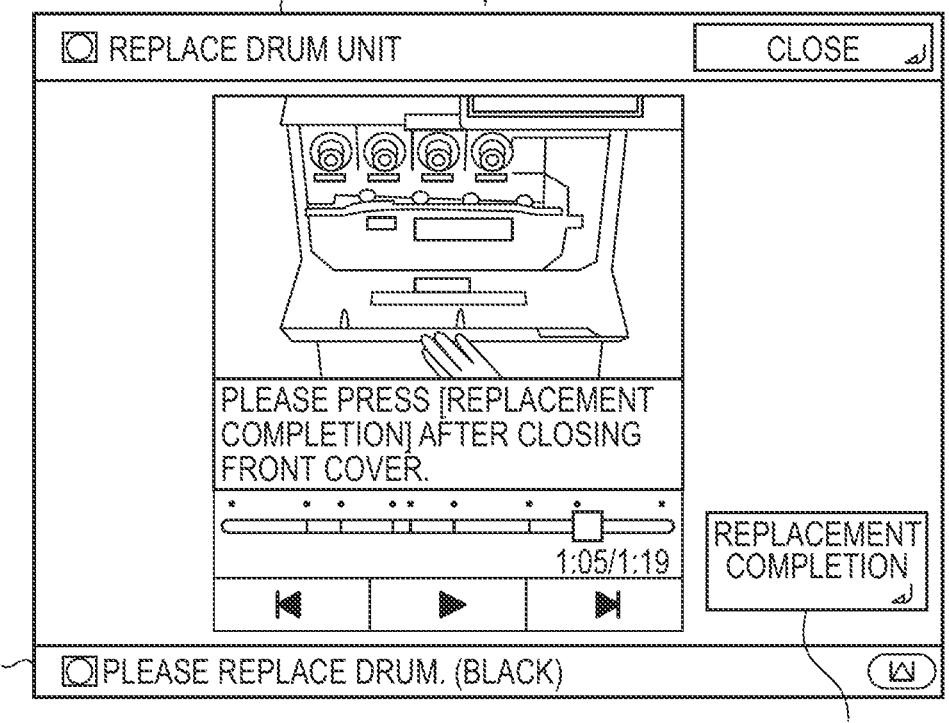
Figure 8H:
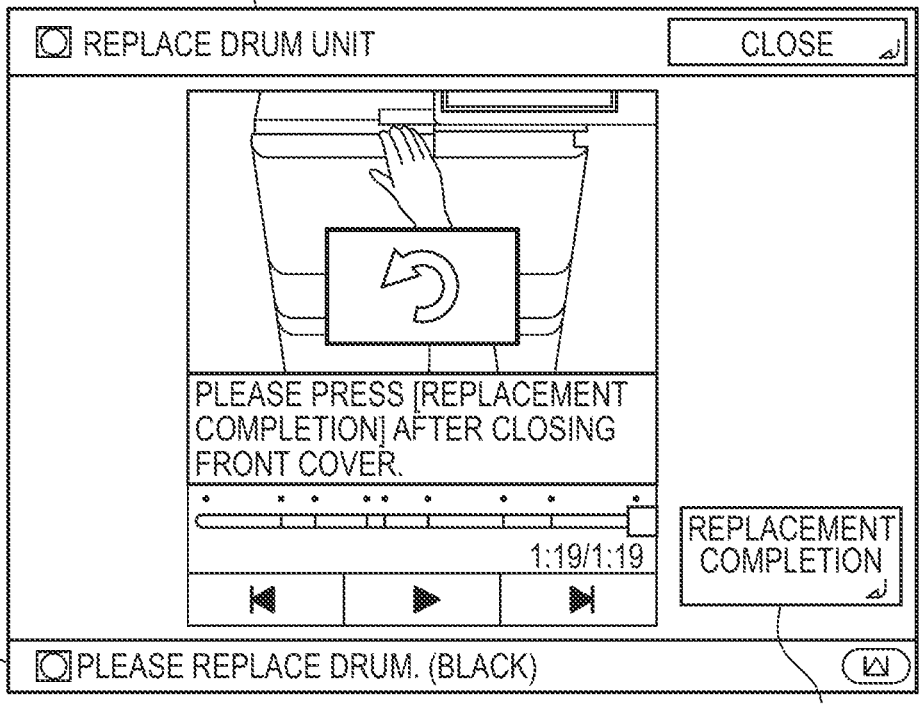
Figure 9A:
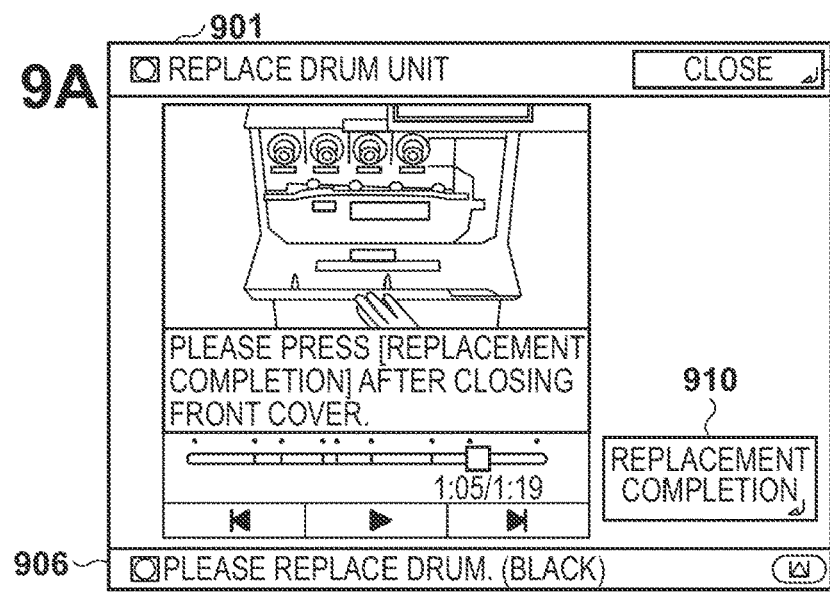
FIGS. 9A to 9E are views showing screen transition displayed on an output unit of the image forming apparatus.
Figure 9B:
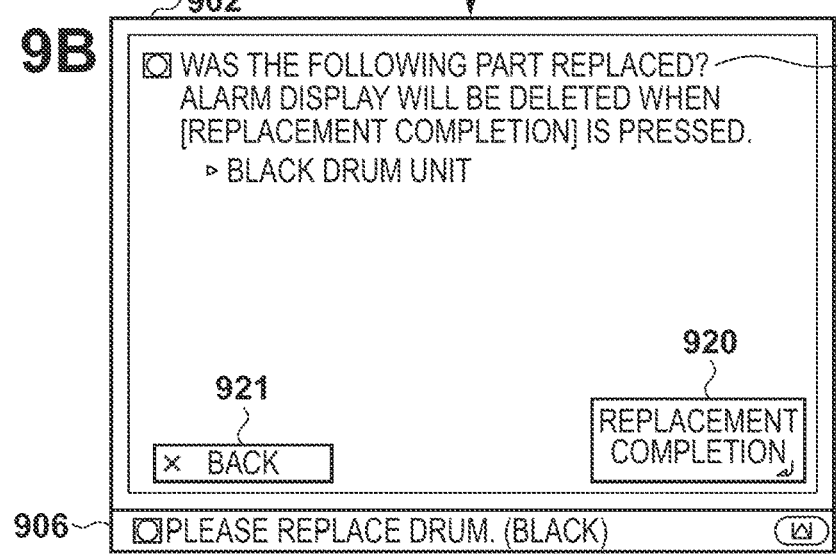
Figure 9C:
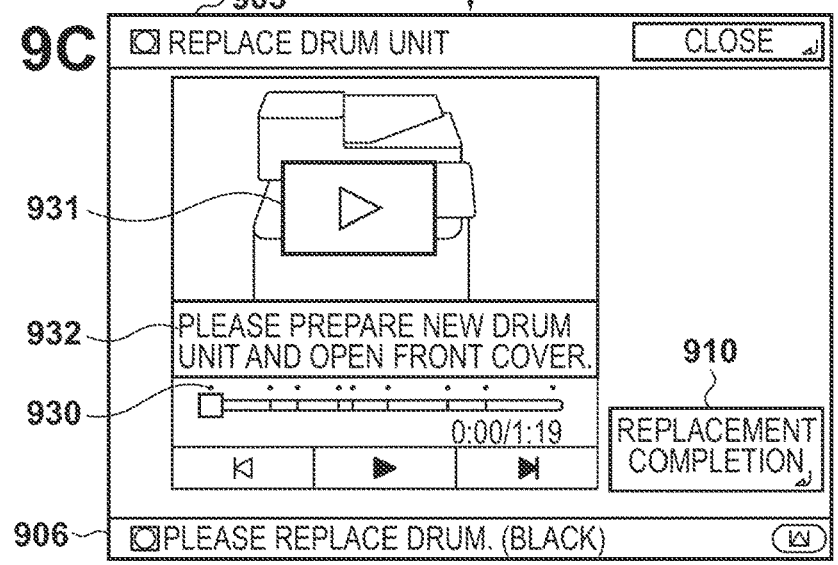
Figure 9D:
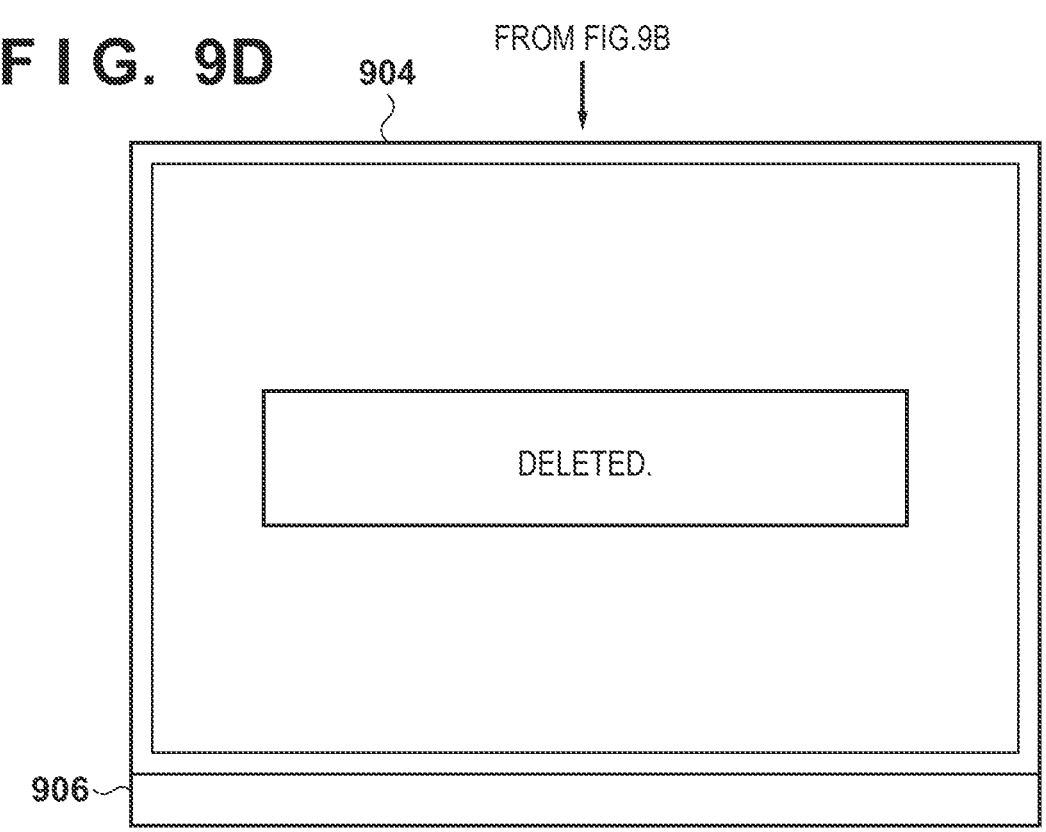
Figure 9E:
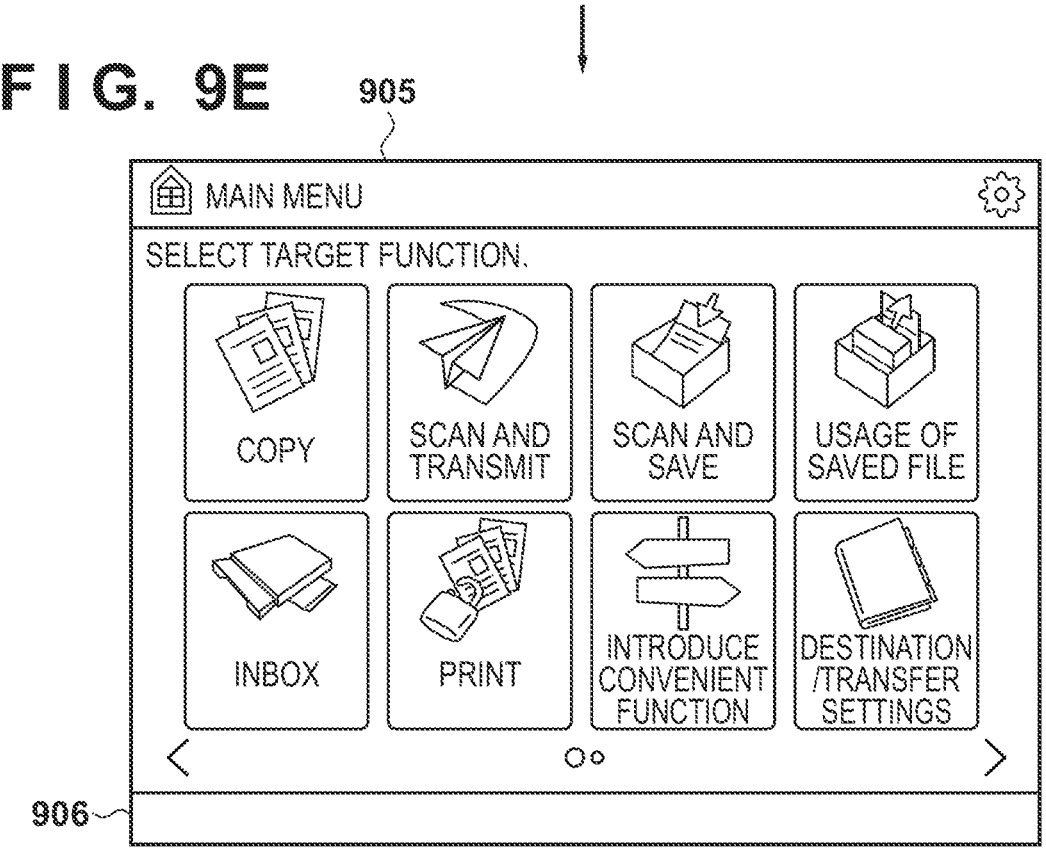

In step S1203, based on the cover opening/closing flag 514 of the moving image table 510, the CPU 101 loads, into the RAM 104, the first partial moving image indicating the work contents after the cover is opened. The CPU 101 then changes the display to the start of the main moving image by displaying the loaded partial moving image in the stop state on the output unit 115, and returns to the process in step S1202. For example, if the maintenance ID is 017, the start of the main moving image, that is, the first partial moving image whose cover opening/closing flag 514 is "1" is C2. In this manner, the maintenance screen 805 in FIG. 8E is displayed on the output unit 115.

The CPU 101 determines in step S1204 whether the detection target cover 405 obtained in step S1003 is closed (the state is changed from the open state to the closed state). For example, if the maintenance event of the black photosensitive drum life end (the maintenance ID is 017) has occurred, it is determined whether the front printer cover 260 is closed. In this case, if it is determined that the detection target cover 405 obtained in step S1003 is closed, the CPU 101 advances the step to step S1205. On the other hand, if it is determined in step S1204 that the detection target cover 405 is not changed from the open state to the closed state, the CPU 101 advances the process to step S1206.

The CPU 101 determines in step S1206 whether there is an instruction for displaying the confirmation screen confirming whether the replacement of the consumable part is completed. For example, the CPU 101 determines in step S1206 whether the replacement completion key 910 is pressed on the maintenance screen 901 shown in FIG. 9A. If it is determined in step S1206 that the instruction for displaying the confirmation screen confirming whether the replacement of the consumable part is completed, the CPU 101 advances the process to step S1205.

In step S1205, the CPU 101 displays, on the output unit 115, the confirmation screen confirming whether the replacement of the consumable part is complete. For example, if the maintenance event of the black photosensitive drum life end (the maintenance ID is 017) occurs, the display is changed from the maintenance screen 901 to the replacement completion confirmation screen 902 shown in FIGS. 9A to 9B. On the other hand, if there is no instruction for displaying the confirmation screen confirming whether the replacement of the consumable part is completed in step S1206, the process advances to step S1214.

The CPU 101 determines in step S1214 whether there is a non-display instruction of the maintenance screen indicating the replacement method of the consumable part. For example, the CPU 101 determines whether a close key 911 is pressed on the maintenance screen 901 shown in FIG. 9A. If it is determined in step S1214 that there is the non-display instruction of the maintenance screen indicating the replacement method of the consumable part, the CPU 101 advances the process to step S1213. On the other hand, if it is determined in step S1214 that there is no non-display instruction of the maintenance screen indicating the replacement method of the consumable part, the CPU 101 returns the process to step S1202.

Next, the CPU 101 determines in step S1207 whether there is a re-display instruction of the maintenance screen indicating the replacement method of the consumable part. For example, the CPU 101 determines whether the return key 921 is pressed on the replacement completion confirmation screen 902 shown in FIG. 9B.

If it is determined in step S1207 that there is the re-display instruction of the maintenance screen indicating the replacement method of the consumable part, the CPU 101 advances the process to step S1208 and displays the maintenance screen on the output unit 115. For example, if the maintenance event of the black photosensitive drum life end (the maintenance ID is 017) has occurred, the display is changed from the replacement completion confirmation screen 902 to the maintenance screen 903 shown in FIGS. 9B to 9C.

Next, in step S1210, the CPU 101 changes the display to the start of the preparation moving image and returns to the process in step S1202. On the other hand, if it is determined in step S1207 that there is no re-display instruction of the maintenance screen indicating the replacement method of the consumable part, the CPU 101 advances the process to step S1209.

The CPU 101 determines in step S1209 whether there is an instruction indicating that the user inputs the completion of the replacement of the consumable part. For example, the CPU 101 determines whether the replacement completion key 922 is pressed on the replacement completion confirmation screen 902 shown in FIG. 9B.

If the CPU 101 determines in step S1209 that there is an instruction indicating that the user inputs the completion of the replacement of the consumable part, the CPU 101 advances the process to step S1211 and resets the consumption degree 402 and the remaining operation day count 403 of the corresponding consumable part. On the other hand, if the CPU 101 determines in step S1209 whether there is no instruction indicating that the user inputs the completion of the replacement of the consumable part, the process returns to step S1207.

Next, in step S1212, the CPU 101 displays, on the output unit 115, the screen indicating that the replacement of the consumable part is completed. For example, if the maintenance event of the black photosensitive drum life end (the maintenance ID is 017) has occurred, the display is changed from the replacement completion confirmation screen 902 shown in FIG. 9B to the replacement completion screen 904 shown in FIG. 9D.

In step S1213, the CPU 101 displays the main menu screen on the output unit 115. For example, if the maintenance event of the black photosensitive drum life end (the maintenance ID is 017) is solved, the display is changed from the replacement completion replacement completion screen 904 to the main menu screen 905 shown in FIGS. 9D to 9E. In this manner, the display processing performed when the replacement procedure of the consumable part of the type for which it is not possible to detect the solution of the maintenance event ends.

As has been described above, according to the arrangement of this embodiment, information indicating whether the consumable part is the consumable part of the type for which it is possible to detect the solution of the maintenance event for each consumable part and information concerning the cover for exposing the mounting portion when replacing the consumable part are stored in the storage. In addition, according to the arrangement of this embodiment, when the consumable part of the type for which it is possible to detect the solution of the maintenance event is to be replaced, it is determined whether the maintenance event is solved when the state of the detection target cover is changed from the open state to the closed state. The screen corresponding to the above determination result is output to the output unit.

On the other hand, when the consumable part of the type for which it is not possible to detect the solution of the maintenance event is to be replaced, the confirmation screen confirming whether the replacement of the consumable part is completed when the state of the detection target cover is changed from the open state to the closed state is displayed on the output unit. In addition, whether the input indicating the completion of the replacement of the consumable part is instructed on the confirmation screen or whether re-display of the maintenance screen indicating the replacement method of the consumable part is instructed is determined. The screen corresponding to the above determination result is displayed on the output unit. If the input indicating the completion of the replacement of the consumable part is instructed on the confirmation screen, the consumption degree and the remaining operation day count are reset, and the maintenance screen ends. That is, according to this embodiment, under the conditions that the cover is closed or the completion of the replacement of the consumable part is instructed, resetting of the maintenance information and the end of the maintenance screen are performed.

Accordingly, the operability for causing the user to replace the consumable part which cannot be automatically detected by the apparatus can be improved. When replacing the consumable part which cannot be automatically detected by the apparatus, the life of the consumable part managed by the apparatus can be properly reset with a simple work in accordance with the user operation instruction. At the same time, the image forming apparatus with a simple arrangement at low cost can be provided to the user.

In the above embodiment, the maintenance events such as the toner absence, the recovered toner full state, the photosensitive drum life end, the fixing unit life end, and the original feeding roller life end have been described above. However, the present invention is not limited to them. In the above embodiment, the image forming apparatus having the plurality of functions such as the copy function and the scan function is exemplified. However, the present invention is also applicable to an image processing apparatus having some of these functions.

In the above embodiment, the occurrence of the maintenance event by the display of the user interface screen in each of FIGS. 6A to 6H, and 9A to 9E and the guidance are notified, and the instruction input is accepted by the pressing of the key on the screen. However, the instruction input method and the notification method are not limited to these. For example, the display and transition of the maintenance screens described with reference to FIGS. 6A to 6H, and 9A to 9E may be performed in a combination with an audio instruction accepted via a microphone of the input unit 113. For example, if an audio instruction "Display a maintenance screen." from the user is accepted in a state in which the screen 801 is displayed, the maintenance screen 802 may be displayed. If an audio instruction "Play back." is accepted on the maintenance screen 802, a moving image may be played back. In addition, in place of the acceptance of the pressing of the replacement completion key 820, when an audio input "display the replacement completion confirmation screen" from the user is accepted, the replacement completion confirmation screen 902 may be displayed. In addition, when an audio input "Replacement is completed." is accepted from the user at the time of the display of the replacement completion confirmation screen 902, the replacement completion screen 904 may be displayed.

The notification of the occurrence of the maintenance event and the notification of part of the maintenance screen may be output as audio output via a speaker of the output unit 115. For example, together with the display of the status display region 809 in FIGS. 8A to 8H or in place of this, an audio output "Please replace the black drum." may be output as the audio output. In addition, together with the playback of the moving image of each maintenance screen, guidance may be output as the audio output. For example, together with the playback of the moving image of the maintenance screen 806 in FIG. 8F, an audio output "Please set a new black drum unit to the deep position." may be performed. In addition, as the guidance of the replacement completion confirmation screen 902 or the replacement completion screen 904 in FIGS. 9B and 9D, audio outputs "Black drum unit replaced?" and "Alarm display is erased." may be performed.

The convenience of the user can be further improved by allowing the above audio outputs/audio inputs.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-074990, filed Apr. 9, 2018, which is hereby incorporated by reference herein in its entirety.

What is claimed is:

1. An image forming apparatus comprising,
at least one memory storing instructions, and
at least one processor executing the instructions causing the image forming apparatus to:
detect occurrence of an event related to a part of the image forming apparatus;

provide a notification of guidance for replacing the part if the event indicates an event to require replacement of the part;

end the notification of the guidance using, as conditions, a case in which a state of a cover to be opened for the replacement of the part is set in a closed state and a case in which an input of a first instruction that the replacement of the part has completed is accepted;

detect occurrence of another event related to another part of the image forming; apparatus;

provide a notification of guidance for replacing the another part if the another event indicates an event to require replacement of the another part;

detect a solution of the another event by replacement of the another part by using a component of the image forming apparatus, and end the notification of the guidance for replacing the another part when the solution of the another event is detected.

2. The apparatus according to claim 1, wherein the part of the image forming apparatus is a part that the component of the image forming apparatus cannot detect a solution of the event to require replacement of the part.

3. The apparatus according to claim 1, wherein
the part is a photosensitive drum, a fixing unit, or an ADF maintenance kit.

4. The apparatus according to claim 1, further comprising a storage, and wherein the instructions further cause the image forming apparatus to store maintenance information of each of replaced parts of the image forming apparatus, and wherein the part is included in the replaced parts.

5. The apparatus according to claim 4, wherein
the maintenance information includes at least one of a consumption degree of a part and an operation day count of a part, and the maintenance information of the part is reset when the input of the first instruction that the replacement of the part has completed is accepted.

6. The apparatus according to claim 1, wherein
if the state of the cover changes from an open state to the closed state, a screen capable of accepting an input of the first instruction is provided, and if the input of the first instruction is accepted via the screen, the notification of the guidance is ended.

7. The apparatus according to claim 1, wherein the instructions further cause the image forming apparatus to:

accept a second instruction for providing a screen capable of accepting an input of the first instruction while a moving image related to the replacement of the part, and end the notification of the guidance using, as other conditions, a case in which the second instruction is accepted and a case in which an input of the first instruction is accepted via the screen provided based on the second instruction.

8. The apparatus according to claim 7, wherein the moving image includes a first moving image for setting the cover in an open state and a second moving image after the cover is set in the open state.

9. The apparatus according to claim 1, wherein the notification of the guidance is provided in a status display region on a display of the image forming apparatus.

10. A control method executed by an image forming apparatus, comprising:

detecting occurrence of an event which related to a part of the image forming apparatus;

providing a notification of guidance for replacing the part if the event indicates an event to require replacement of the part;

ending the notification of the guidance using, as conditions, a case in which a state of a cover to be opened for the replacement of the part is set in a closed state and a case in which an input of a first instruction that the replacement of the part has completed is accepted;

detecting occurrence of another event related to another part of the image forming; apparatus;

providing a notification of guidance for replacing the another part if the another event indicates an event to require replacement of the another part;

detecting a solution of the another event by replacement of the another part by using a component of the image forming apparatus, and ending the notification of the guidance for replacing the another part when the solution of the another event is detected.

11. A non-transitory computer-readable storage medium storing a program for causing a computer to detect occurrence of an event which related to a part of the image forming apparatus;

provide a notification of guidance for replacing the part if the event indicates an event to require replacement of the part;

end the notification of the guidance using, as conditions, a case in which a state of a cover to be opened for the replacement of the part is set in a closed state and a case in which an input of a first instruction that the replacement of the part has completed is accepted;

detect occurrence of another event related to another part of the image forming; apparatus;

provide a notification of guidance for replacing the another part if the another event indicates an event to require replacement of the another part;

detect a solution of the another event by replacement of the another part by using a component of the image forming apparatus, and end the notification of the guidance for replacing the another part when the solution of the another event is detected.

* * * * *